United States Patent
Morichika et al.

(10) Patent No.: US 7,412,113 B2
(45) Date of Patent: Aug. 12, 2008

(54) CAPTURED IMAGE PROJECTION APPARATUS AND CAPTURED IMAGE CORRECTION METHOD

(75) Inventors: Kazumasa Morichika, Ome (JP); Kunio Sato, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 605 days.

(21) Appl. No.: 10/858,708

(22) Filed: Jun. 1, 2004

(65) Prior Publication Data

US 2005/0163396 A1 Jul. 28, 2005

(30) Foreign Application Priority Data

Jun. 2, 2003 (JP) .............................. 2003-157384

(51) Int. Cl.
G06K 9/36 (2006.01)
G01B 11/26 (2006.01)
G01C 1/06 (2006.01)

(52) U.S. Cl. ........................ 382/289; 382/290; 356/138; 702/150

(58) Field of Classification Search .................. 382/289, 382/295, 290; 356/138; 702/150
See application file for complete search history.

(56) References Cited

U.S. PATENT DOCUMENTS

| | | | | |
|---|---|---|---|---|
| 4,964,066 A * | 10/1990 | Yamane et al. ............... 345/441 |
| 5,077,811 A | 12/1991 | Onda |
| 5,355,420 A | 10/1994 | Bloomberg et al. |
| 5,940,128 A * | 8/1999 | Morimura ................. 348/240.3 |
| 6,304,298 B1 * | 10/2001 | Steinberg et al. ............ 348/587 |
| 6,389,155 B2 * | 5/2002 | Funayama et al. ........... 382/118 |
| 2001/0020977 A1 * | 9/2001 | Watanabe .................... 348/222 |
| 2003/0025788 A1 | 2/2003 | Beardsley |

FOREIGN PATENT DOCUMENTS

| | | |
|---|---|---|
| EP | 0 881 592 A2 | 12/1998 |
| EP | 1 100 257 A1 | 5/2001 |

(Continued)

OTHER PUBLICATIONS

Communication pursuant to Article 96(2) issued by the European Patent Office in connection with counterpart European Patent Application Serial No. 04 745 695-9—1241, dated Apr. 19, 2006, 6 pages.

(Continued)

*Primary Examiner*—Matthew C. Bella
*Assistant Examiner*—Randolph Chu
(74) *Attorney, Agent, or Firm*—Frishauf, Holtz, Goodman & Chick, P.C.

(57) ABSTRACT

A calligraphy/drawing camera image-captures a document and sends a resultant captured image to a personal computer (S101). The personal computer applies various image processes such as correction of various deformations including a trapezoidal deformation based on image information obtained from the captured image, a rotation process, a cut out process, etc. to the captured image (S102 to S104). The personal computer sends the processed image to a projector (S105). The projector projects the processed image on a screen (S106). Since the captured image is corrected based on the image information obtained from the captured image, not only correction of a trapezoidal deformation but also various other corrections can be done on the captured image.

8 Claims, 34 Drawing Sheets

FOREIGN PATENT DOCUMENTS

| | | | |
|---|---|---|---|
| EP | 1 276 074 A2 | | 1/2003 |
| EP | 1276074 | * | 1/2003 |
| JP | 2002-354331 A | | 12/2002 |

OTHER PUBLICATIONS

W. Newman et al: "Camworks: a video-based tool for efficient capture from paper source documents", Multimedia Computing and Systems, 1999, IEEE International Conference on Florence, Italy, Jun. 7-11, 1999, Los Alamitos, CA, USA, IEEE Comput. Soc. US, Jun. 7, 1999, pp. 647-653, XP010519463, ISBN: 0-7695-0253-9, col. 2, line 7-line 12; col. 7, line 6-line 12.

G. F. McLean: "Geometric Correction of Digitized Art", CVGIP Graphical Models and Image Processing, Academic Press, Duluth, MA, US, vol. 58, No. 2, Mar. 1996, pp. 142-154, XP004418999, ISSN: 1077-3169—entire document.

Clark, P. and Mirmehdi, M., "Location and Recovery of Text on Oriented Surfaces" Proceedings of the SPIE., vol. 3967, 2000, pp. 267-277, Bellingham, VA US, XP-002264506, pp. 267-277.

* cited by examiner

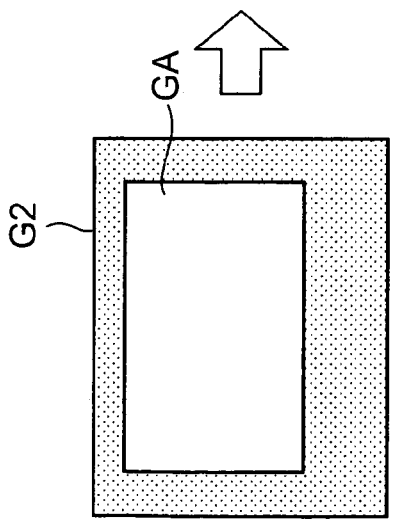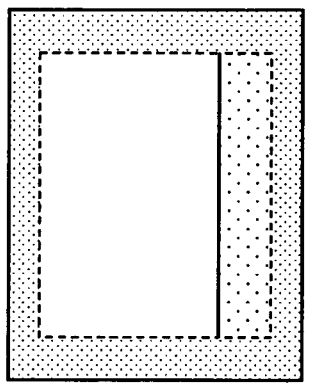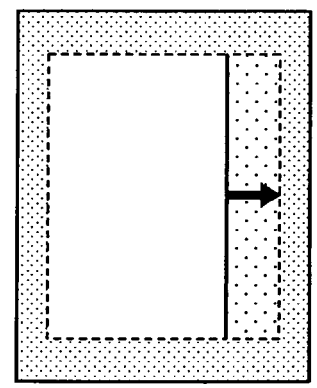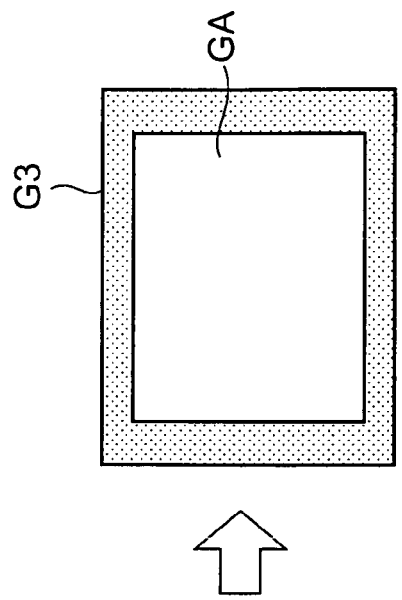

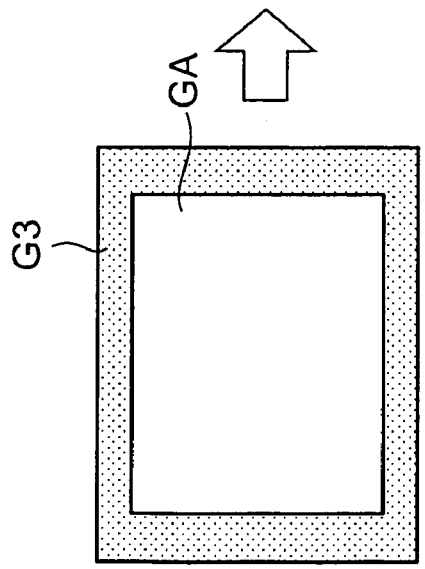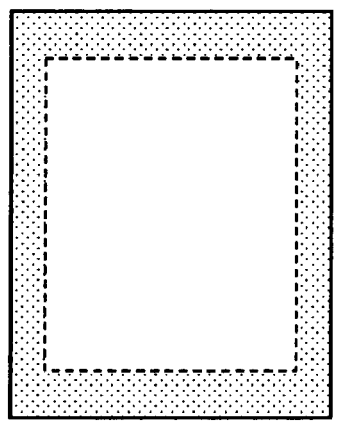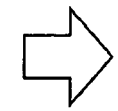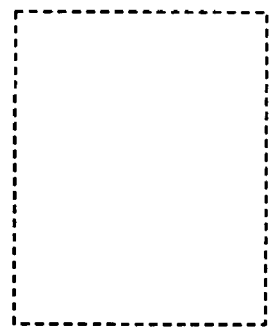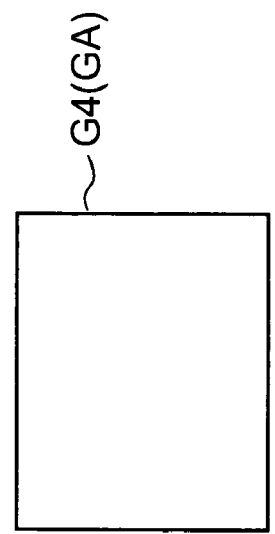

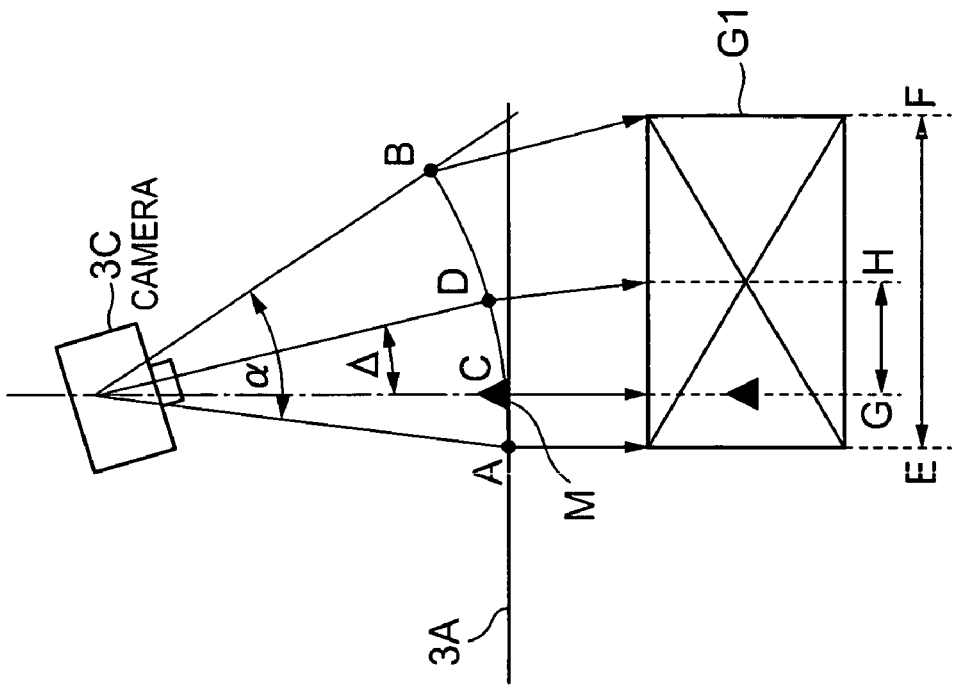
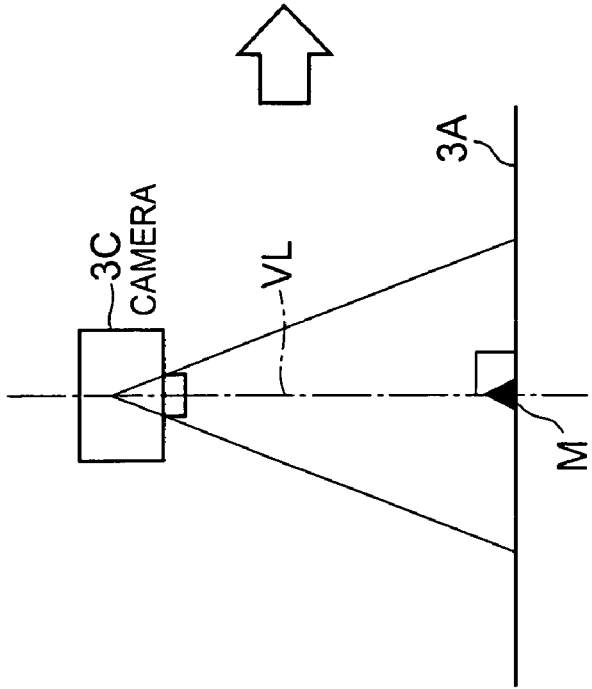

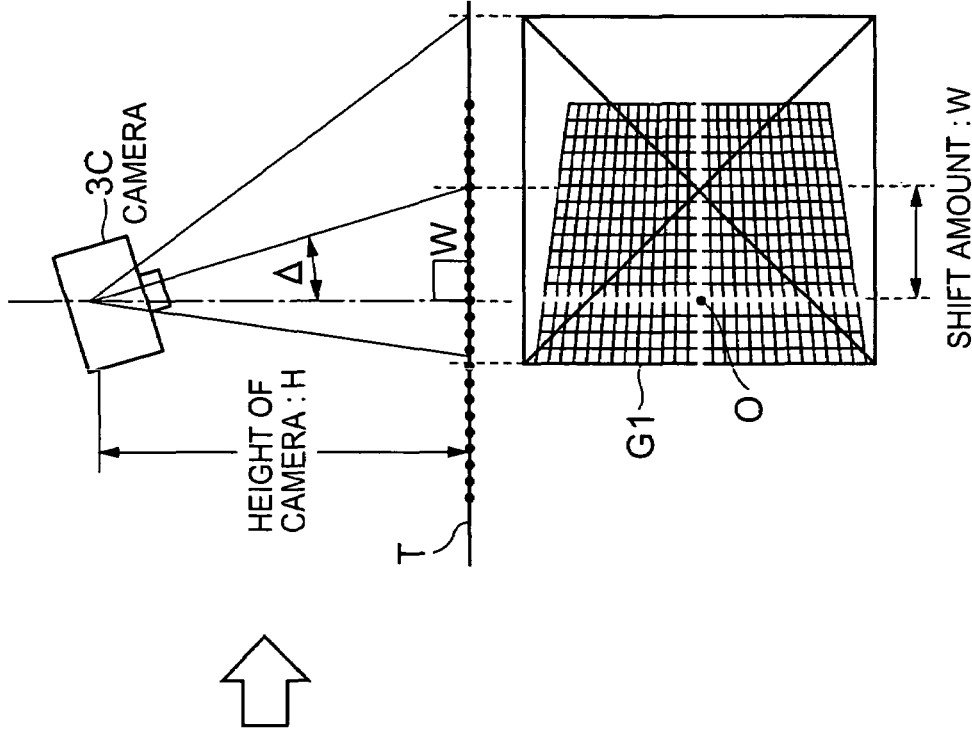
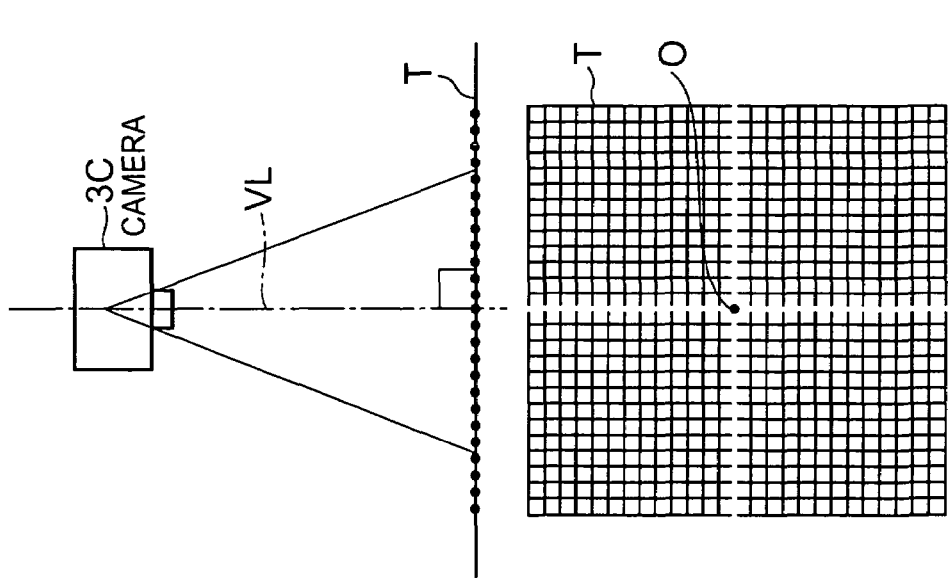

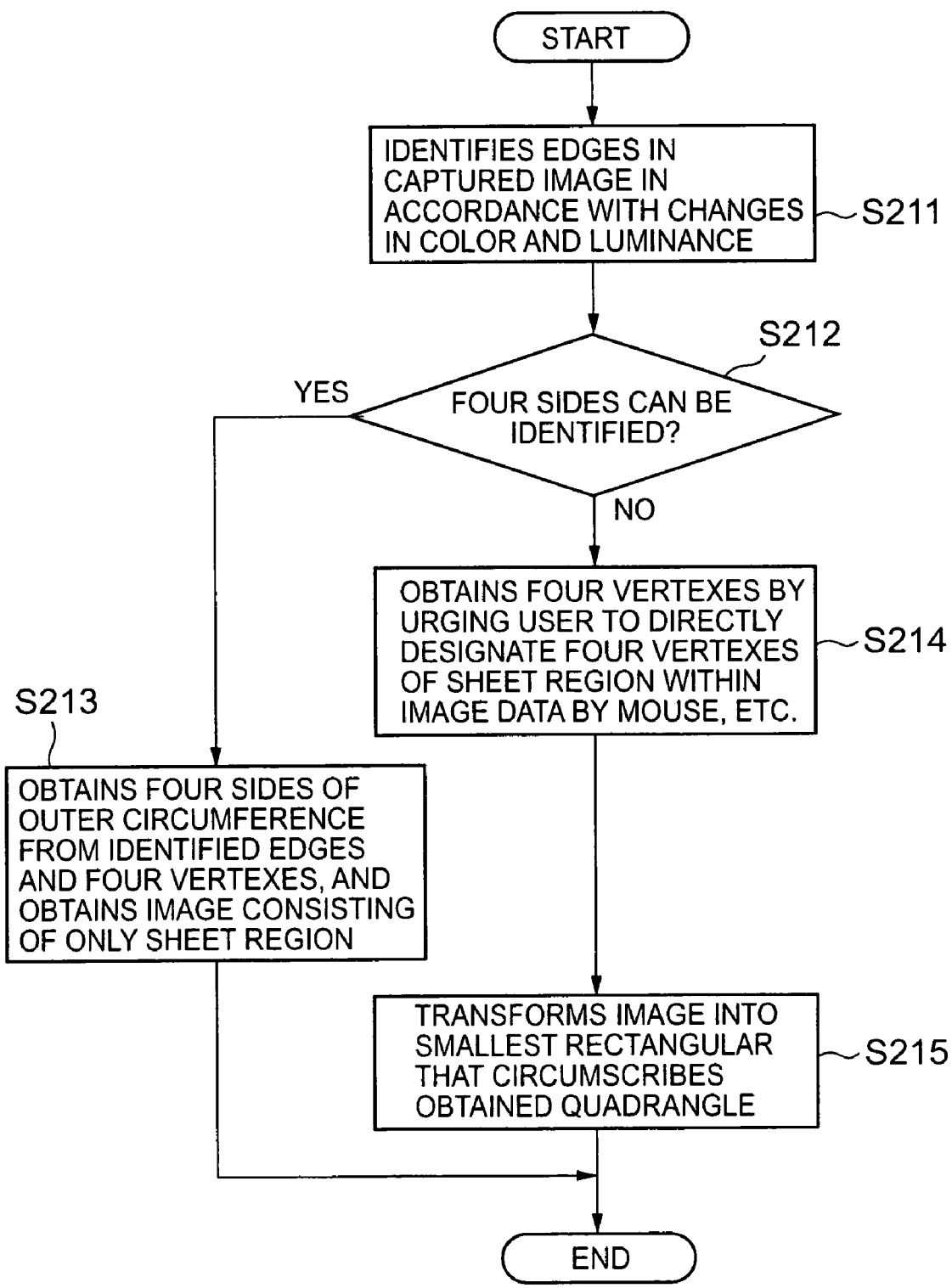

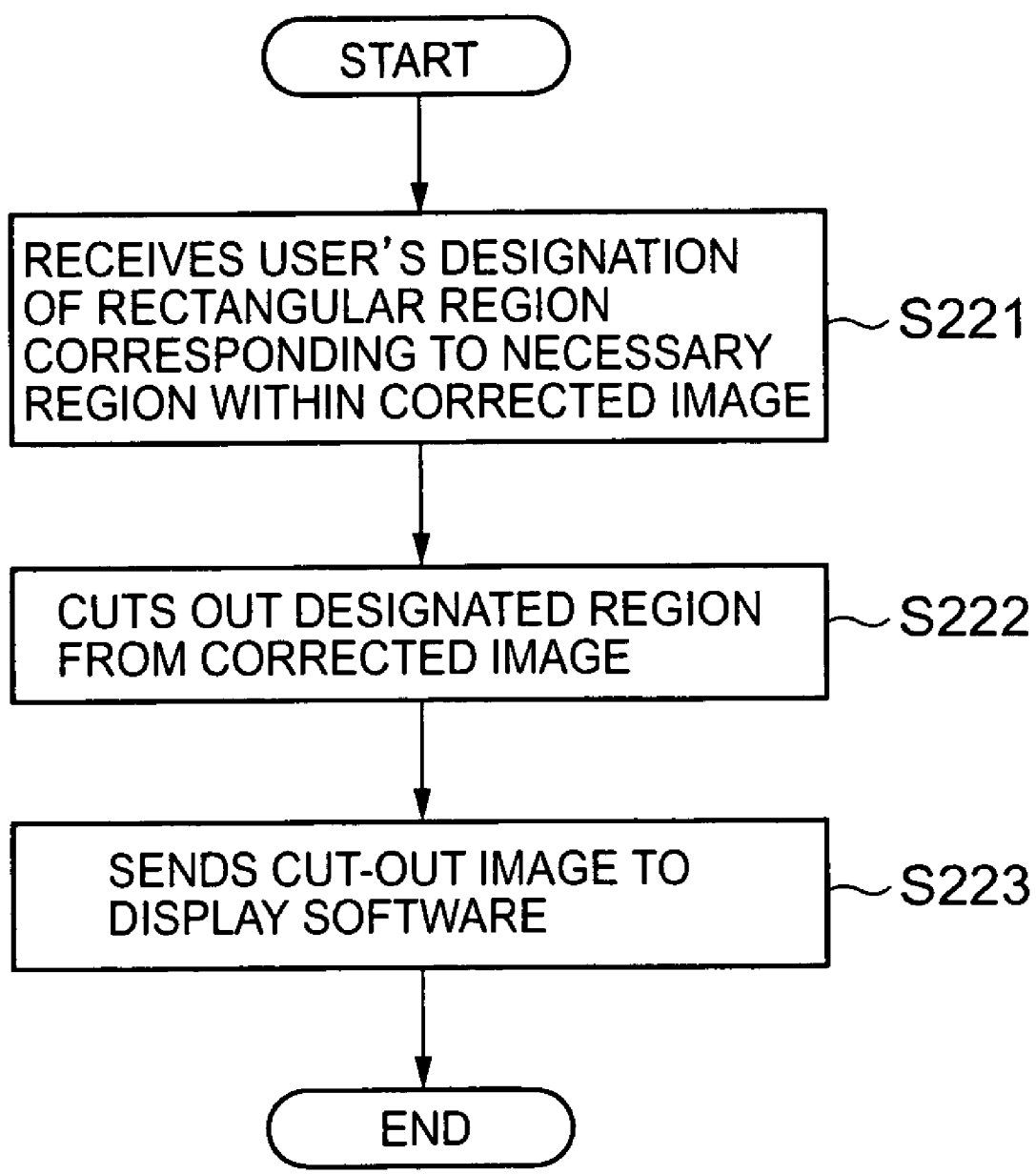

CAPTURED IMAGE PROJECTION APPARATUS AND CAPTURED IMAGE CORRECTION METHOD

BACKGROUND OF THE INVENTION

1. Field of the Invention

The present invention relates to a captured image projection apparatus and a correction method for a captured image.

2. Description of the Related Art

Recently, projectors are used in presentations, meetings, etc. to expandingly project documents (characters and drawings, etc.) stored in personal computers on a screen. Projectors generally have a configuration for converting image information of documents obtained from personal computers, etc. into projection light by using an image conversion element such as liquid crystal, micro mirror array, etc.

In a case where a projector is used in a meeting, etc., in addition to the documents in the personal computer, written materials (newspapers, articles in magazines, presentation papers, written documents, etc.) one has on hand may need to be projected. In this case, since the written materials need to be digitalized (need to be converted into image data), image capturing of the written materials is done by using a so-called calligraphy/drawing camera. As the calligraphy/drawing camera, for example, one that has a configuration of a digital camera having a CCD and a MOS type image capture element is used.

In image-capturing the written materials using the calligraphy/drawing camera for digitalization, it is necessary to match the orientation of the paper and that of the calligraphy/drawing camera. For example, in image-capturing, if the camera is inclined, that is, if the center axis of the lens is not perpendicular to the written material, the resultant captured image is trapezoidally deformed and cannot be a rectangular image. A method of solving this problem is disclosed in, for example, Unexamined Japanese Patent Application KOKAI Publication No. 2002-354331 (FIG. 6). According to this method, in an image capturing apparatus in which a camera unit is supported by a support pillar on a document mounting, an angle detection sensor for detecting the inclination angle of the camera unit with respect to the document mounting is provided. By using the inclination angle detected by the angle detection sensor, the trapezoidal deformation in the captured image is corrected.

However, according to this method for correcting the captured image based only on the inclination angle of the camera unit, adjustment of the captured image before projection is limited to only correction of the trapezoidal deformation. For example, in image-capturing a written material for projecting the material on a screen, it is difficult to match the size, the orientation, etc. of the photo-object (written material) with the image range of the camera accurately. If correction other than correction for trapezoidal deformation is required as in this case, the above-described method cannot adjust the captured image.

Further, according to the above-described method, in a case where image-capturing of a large-sized written material is done without mounting the written material on the document mounting and by adjusting the orientation of the camera unit, if the written material is inclined, it is difficult to obtain the accurate inclination angle of the camera unit, i.e. the accurate image capturing angle with respect to the written material. Accordingly, in this case, there is a problem that trapezoidal deformation in the captured image cannot be properly corrected.

SUMMARY OF THE INVENTION

The present invention was made in view of the above circumstance, and relates to a captured image projection apparatus and a captured image correction method which are capable of dealing with various corrections necessary for adjusting a captured image before projection, and of performing an accurate correction.

A captured image projection apparatus according to a first aspect of the present invention comprises: a projection section which projects a captured image obtained by image-capturing a written material on a screen; an obtaining section which obtains predetermined image information from the captured image; and a correction section which corrects the captured image based on the predetermined image information obtained by the obtaining section.

A captured image projection apparatus according to a second aspect of the present invention comprises: a projection section which projects a captured image of a written material which is obtained by a predetermined image capturing apparatus on a screen; an image capturing angle obtaining section which obtains, based on a captured image which is obtained by image-capturing another photo-object than the written material before the image capturing apparatus image-captures the written material, by using the same image capturing apparatus, a same image capturing angle as an angle for the image-capturing of the another photo-object; and a correction section which corrects an inclination of the captured image of the written material based on the image capturing angle obtained by the image capturing angle obtaining section.

A captured image projection apparatus according to a third aspect of the present invention is for image-capturing a written material by a camera supported by a camera mounting and projecting a captured image obtained by the image-capturing on a screen, and comprises: a first inclination angle detection section which detects an inclination angle of the camera which is produced by an image capturing direction of the camera and a vertical line; a second inclination angle detection section which detects an inclination angle of the camera mounting which is produced by a perpendicular line drawn towards the camera mounting and the vertical line; a calculation section which calculates an image capturing angle of the camera to the written material, based on both of the inclination angle of the camera and inclination angle of the camera mounting detected by the first and second inclination angle detection sections; and a correction section which corrects an inclination of the captured image, based on the image capturing angle calculated by the calculation section.

A captured image correction method according to a fourth aspect of the present invention is for a captured image projection apparatus which projects a captured image obtained by image-capturing a written material on a screen, and comprises: a step of obtaining from the captured image, predetermined image information included in the captured image; and a step of correcting the captured image based on the obtained predetermined image information.

A program according to a fifth aspect of the present invention is for controlling a computer, which is included in a captured image projection apparatus for projecting a captured image obtained by image-capturing a written material on a screen, to function as: an obtaining section which obtains predetermined image information from the captured image; and a correction section which corrects the captured image based on the image information obtained by the obtaining section.

A captured image correction method according to a sixth aspect of the present invention is for a captured image projection apparatus for image-capturing a written material by a camera and projecting a captured image obtained by the image-capturing on a screen, and comprises: a step of image-capturing another photo-object by the camera prior to the image-capturing of the written material, at a same image capturing angle; a step of pre-obtaining the image capturing angle, based on a captured image obtained by the image-capturing of the another photo-object; and a step of correcting an inclination of the captured imaged obtained by image-capturing the written material, based on the pre-obtained image capturing angle.

A program product according to a seventh aspect of the present invention is for controlling a computer, included in a captured image projection apparatus for projecting a captured image of a written material obtained by a camera on a screen, to function as: an image capturing angle obtaining section which obtains, based on a captured image which is obtained by image-capturing another photo-object than the written material before image-capturing of the written material, by using the same camera, a same image capturing angle as an angle for the image-capturing of the another photo-object; and a correction section which an inclination of the captured image of the written material, based on the image capturing angle obtained by the image capturing angle obtaining section.

A captured image correction method according to an eighth aspect of the present invention is for a captured image projection apparatus which image-captures a written material by a camera supported by a camera mounting and projects a captured imaged obtained by the image-capturing on a screen, and comprises: a step of detecting an inclination angle of the camera which is produced by an image capturing direction of the camera and a vertical line, and an inclination angle of the camera mounting which is produced by a perpendicular line drawn from the camera to the camera mounting and a vertical line; a step of calculating an image capturing angle of the camera to the written material, based on both of the detected inclination angle of the camera and inclination angle of the camera mounting; and a step of correcting an inclination of the captured image obtained by image capturing the written material by the camera, in accordance with the calculated image capturing angle.

A program product according to a ninth aspect of the present invention is for controlling a computer, included in a captured image projection apparatus which image-captures a written material by a camera supported by a camera mounting and projects a captured image obtained by the image-capturing on a screen, to function as: a calculation section which calculates an image capturing angle of the camera to the written material, based on an inclination angle of the camera which is produced by an image capturing direction of the camera and a vertical line, and an inclination angle of the camera mounting which is produced by a perpendicular line drawn from the camera to the camera mounting and a vertical line; and a correction section which corrects an inclination of the captured image based on the image capturing angle calculated by the calculation section.

BRIEF DESCRIPTION OF THE DRAWINGS

These objects and other objects and advantages of the present invention will become more apparent upon reading of the following detailed description and the accompanying drawings in which:

FIGS. 9A to 9D are explanatory diagrams showing the content of the aspect ratio conversion process by the PC;

FIGS. 11A to 11D are explanatory diagrams showing the content of a cut out process by the PC;

FIGS. 15A and 15B are explanatory diagrams showing a state of a calligraphy/drawing camera when obtaining an image capturing angle;

FIGS. 17A and 17B are explanatory diagrams showing a state of the calligraphy/drawing camera when obtaining an image capturing angle;

FIG. 26 is a flowchart showing an operation of the PC according to the eighth embodiment;

FIG. 28 is a flowchart showing an operation of the PC according to the ninth embodiment;

DETAILED DESCRIPTION OF THE PREFERRED EMBODIMENTS

One embodiment of the present invention will now be explained with reference to the drawings.

First Embodiment

Figure 1:
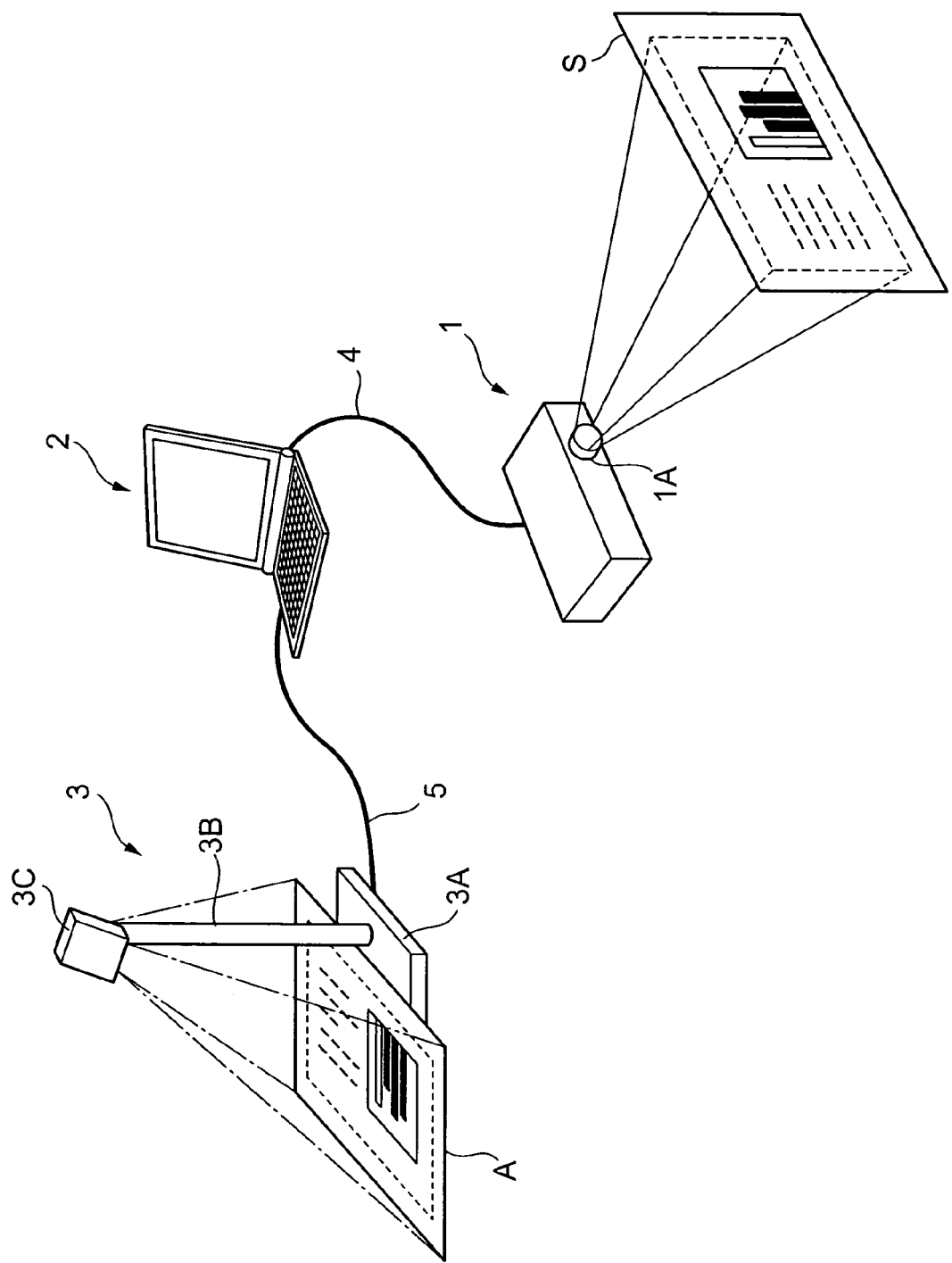
FIG. 1 is a configuration diagram of a captured image projection apparatus which is common to each embodiment of the present invention.

A captured image projection apparatus comprises a projector 1, a lap-top personal computer (hereinafter referred to as PC) 2, and a calligraphy/drawing camera 3, as its configuration diagram being shown in FIG. 1. The projector 1 and the PC 2 are connected via an RGB cable 4. The PC 2 and the calligraphy/drawing camera 3 are connected via an USB cable 5.

The projector 1 is structured such that a projection unit 1A in which an optical system such as a projection lens, etc. is stored is provided on the front surface of the projector body. An optical system such as a projection lens, etc. is stored in the projection unit 1A. The projector 1 projects documents and images on a screen S (or a whiteboard, etc.) by irradiating a light from the projection unit 1A.

The calligraphy/drawing camera 3 comprise a camera mounting 3A, a support pillar 3B which is provided to stand on the camera mounting 3A, and a camera 3C set on the top end of the support pillar 3B. The camera 3C is provided so as to be able to turn upward and downward, and leftward and rightward. When the calligraphy/drawing camera 3 is used, a written material A such as a newspaper, an article in a magazine, a presentation paper, a written document, etc. is mounted on the camera mounting 3A as illustrated, and is image-captured (imaged, picked-up) by the camera 3C.

Figure 2:
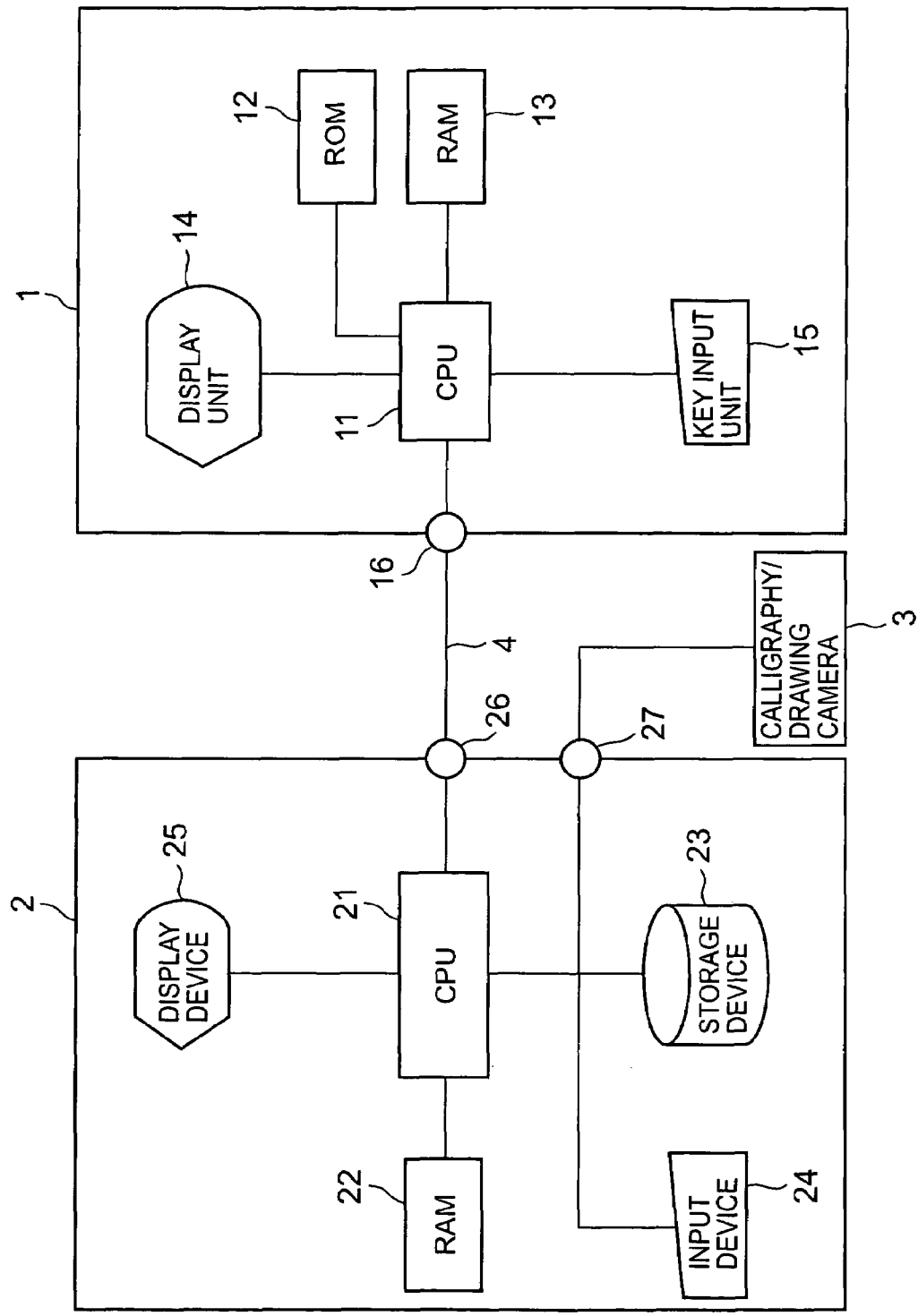
FIG. 2 is a block diagram showing a schematic electric structure of the captured image projection apparatus of FIG. 1.

The projector 1 mainly comprises a CPU 11, a ROM 12, a RAM 13, a display unit 14, and a key input unit 15, as its schematic electrical structure being shown in FIG. 2. Further, the projector has an input terminal 16 for an RGB signal, and the RGB cable 4 is connected to the input terminal 16.

The display unit 14 is the projection section according to the present invention. The display unit 14 includes a light source such as krypton lamp, etc., an image conversion element such as liquid crystal, micro mirror array, etc., a drive circuit, and an optical system such as a projection lens, etc. The display unit 14 projects documents and captured imaged sent from the PC 2 on the screen S. The image conversion element is for converting a light from the light source into a projection light, and the drive circuit is for driving the image conversion element in accordance with an RGB signal input from the input terminal 16. The key input unit is constituted by a plurality of operation buttons for receiving operations on the projector 1 by a user.

The CPU 11 operates in accordance with a program stored in the ROM 12, and controls each of the aforementioned components by using the RAM 13 as a work memory. The input terminal 16 is provided in an unillustrated input image processing circuit which is connected to the CPU 11.

The PC 2 mainly comprises a CPU 21, a RAM 22, a storage device 23, an input device 24 such as a plurality of keys provided on the body of the PC 2 and a mouse connected to the body, etc., and a display device 25 constituted by an LCD and a drive circuit therefore, etc. Further, the PC 2 has an RGB output terminal 26 to which the RGB cable 4 is connected, and a USB connection terminal 27 to which the USB cable 5 is connected.

The storage device 23 is constituted by a hard disk or the like having a relatively large storage capacity. An image processing program and an image display program are stored in the storage device 23. The image processing program is a program for performing later-described various image processes to be applied to a captured image. The image display program is a program for displaying an image based on image data on the display device 25 or for making the image be projected by the projector 1. The RGB output terminal 26 is provided in an unillustrated image signal processing circuit which is connected to the CPU 21. The USB connection terminal 27 is provided in an unillustrated USB input/output interface circuit which is connected to the CPU 21.

Figure 3:
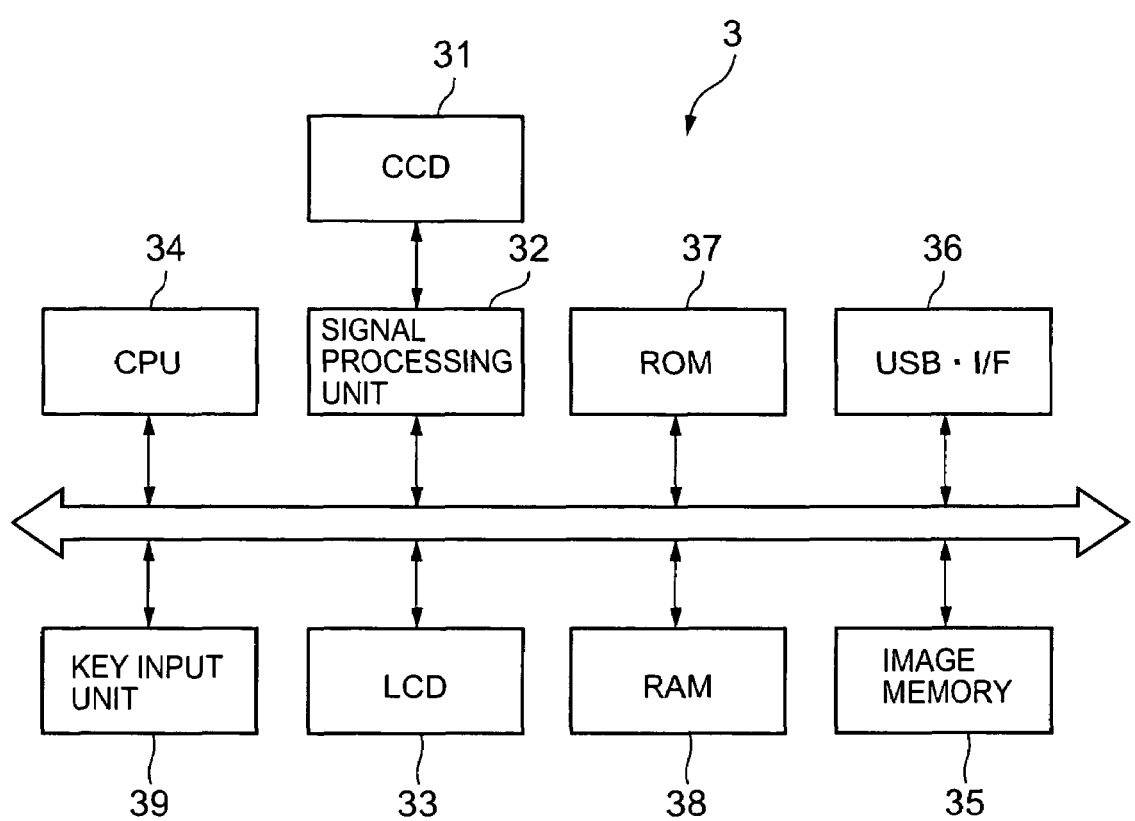
FIG. 3 is a block diagram showing a schematic electric structure of a calligraphy/drawing camera according to first to tenth embodiments of the present invention.

FIG. 3 is a block diagram showing the electric structure of the calligraphy/drawing camera 3 (mainly the camera 3C in the present embodiment). The calligraphy/drawing camera 3 (mainly the camera 3C in the present embodiment) comprises a CCD 31 and a signal processing unit 32, as its electric structure being shown in FIG. 3. The CCD 31 is an imaging element for imaging a written material A via an unillustrated lens. The signal processing unit 32 applies various signal processes to an analog imaging signal output from the CCD 31 and then outputs the signal as a digital image signal. The image signal output from the signal processing unit 32 is sent to an LCD 33 and displayed thereon as a photo-object image when the calligraphy/drawing camera 3 is in an image capture standby state. When the calligraphy/drawing camera 3 is in an image capture state, the image signal is compressed by a CPU 34 in accordance with a predetermined format such as JPEG and stored in an image memory 35. Further, the image signal is output from a USB interface 36 to the PC 2 via the USB cable 5.

The compressed image data stored in the image memory 35 is read by the CPU 34 if necessity arises. The read image data is expanded and then reproduced and displayed on the LCD 33 as a still image, or output to the PC 2. The image memory 35 is a non-volatile memory such as a flash memory, etc. which is built inside the camera 3C or detachable from the camera 3C. Further, the calligraphy/drawing camera 3 comprises a ROM 37, a RAM 38, and a key input unit 39. Various control programs necessary for the CPU 34 to perform compression and expansion of the image data or to control the entire device are stored in the ROM 37. The RAM 38 is a work memory of the CPU 34. The key input unit 39 is constituted by a shutter key and many other operation keys.

Figure 4:
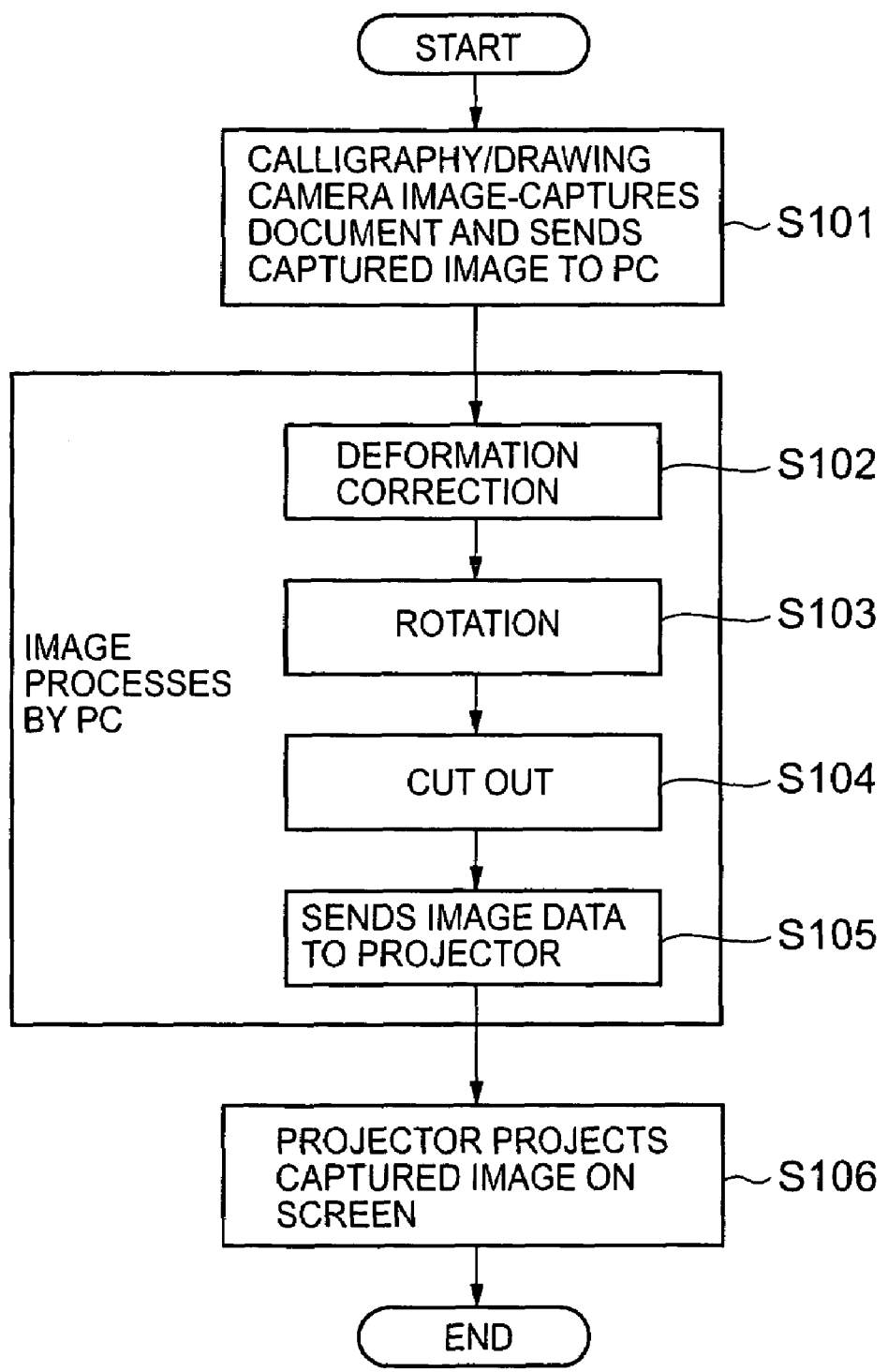
FIG. 4 is a flowchart showing a basic operation of the captured image projection apparatus which is common to each embodiment.

The outline of the operation of the captured image projection apparatus having the above configuration will now be explained with reference to a flowchart shown in FIG. 4.

In the captured image projection apparatus, the calligraphy/drawing camera 3 image-captures an arbitrary document or the like (written material A) and outputs the image data of the captured document to the PC 2 (step S101). The PC 2 corrects the captured image by performing various image processes such as a deformation correction process, a rotation process, a cut out process, etc. on the input image data (step S102 to S104). Then, the PC 2 outputs the processed image data to the projector 1 in accordance with the display program (step S105). The PC 2 performs part or all of the image processes in accordance with necessity. The projector 1 projects the captured image of the document or the like on the screen S based on the image data input from the PC 2 (step S106).

Next, an operation according to the present embodiment for adjusting the captured image of the written material A captured by the calligraphy/drawing camera 3 for projecting the image on the screen S will be explained.

Figure 5:
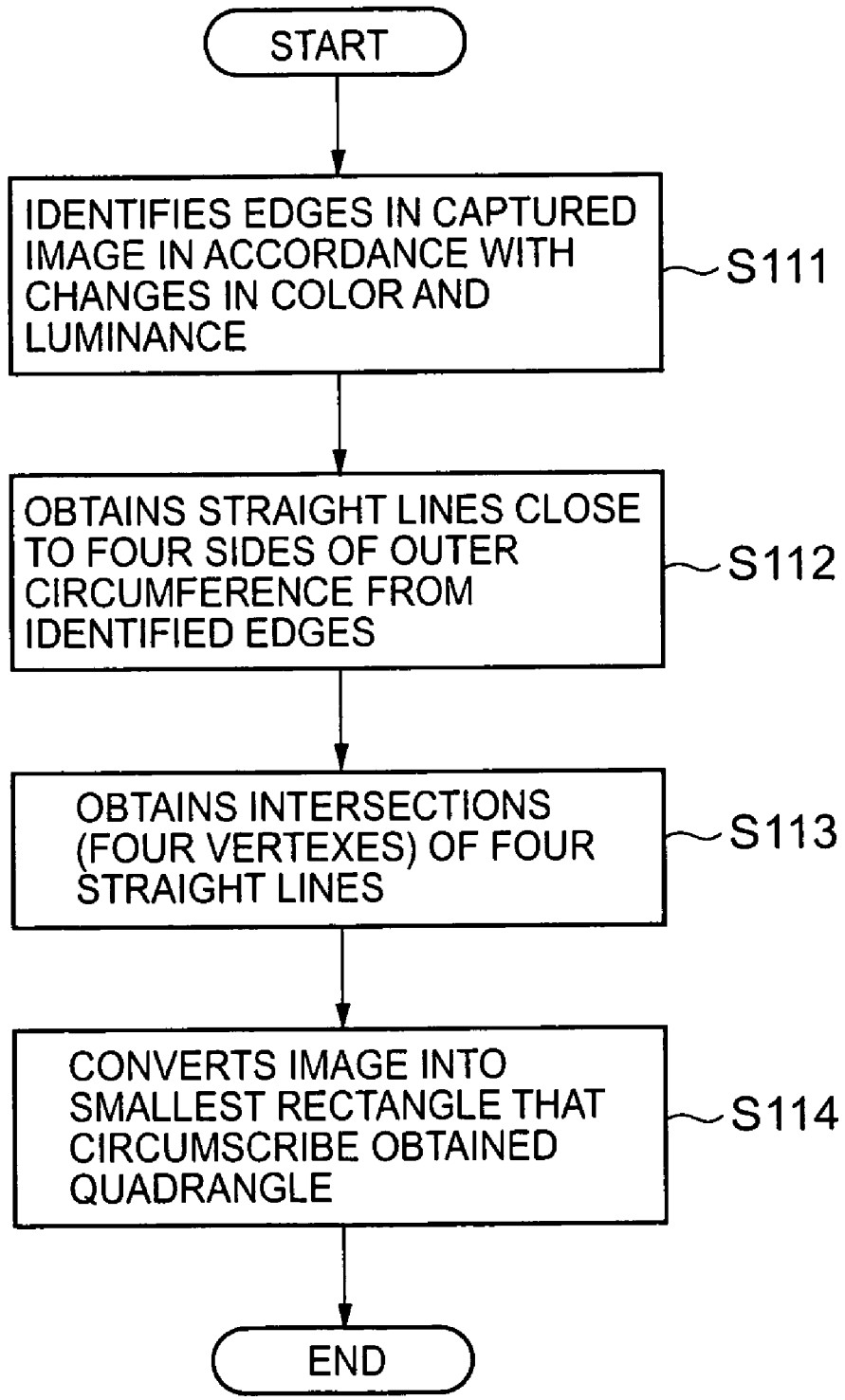
FIG. 5 is a flowchart showing a procedure of a rectangular conversion process by a PC according to the first embodiment.

In the captured image projection apparatus, when a captured image is output from the calligraphy/drawing camera 3 to the PC 2, the PC 2 performs a rectangular conversion process. The rectangular conversion process is a process for correcting deformation in a captured image and converting the shape of the image into a rectangle. The rectangular conversion process will now be explained with reference to FIG. 5 showing a flowchart of the procedure of the process, and FIGS. 6A to 6C showing diagrams explaining the procedure.

Figure 6A:
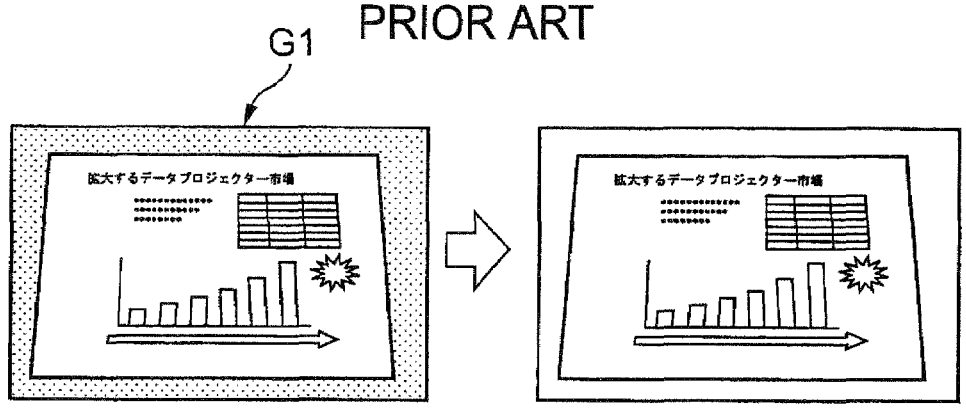
FIGS. 6A to 6C are explanatory, diagrams for the rectangular conversion process by the PC.
Figure 6B:
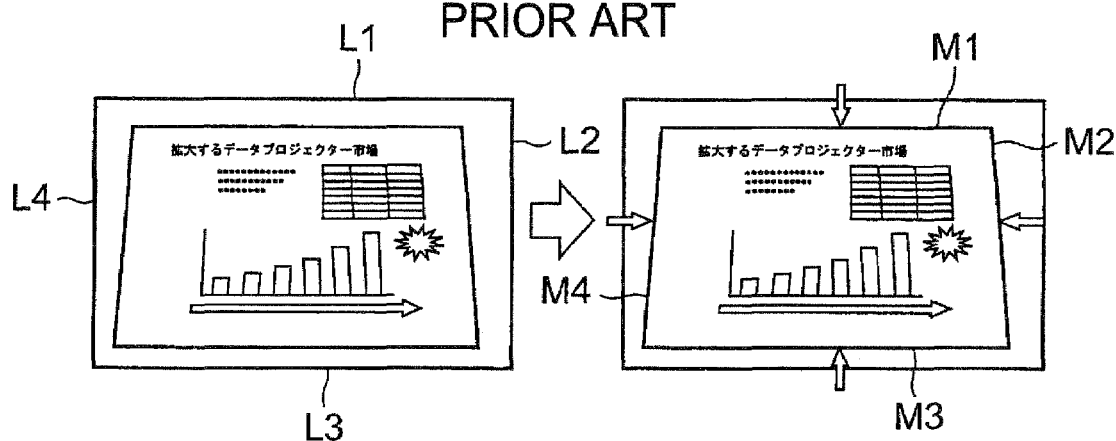
Figure 6C:
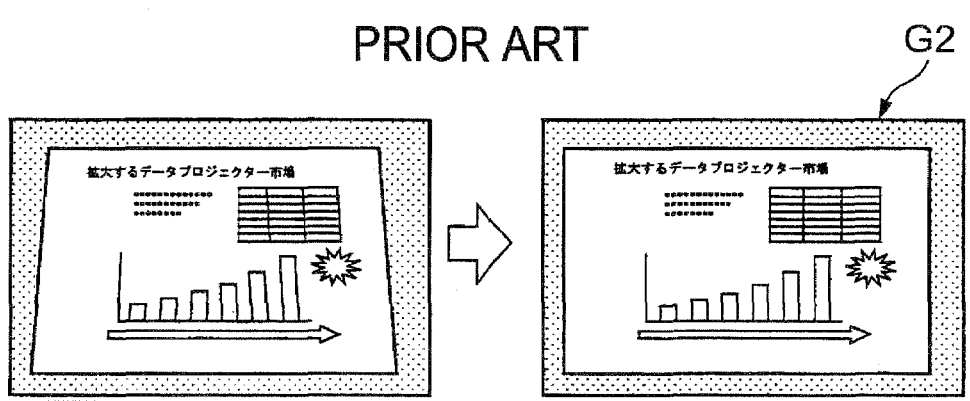
Figure 7A:
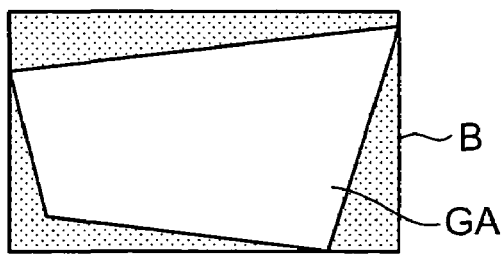
FIGS. 7A to 7E are explanatory diagrams showing the content of shape conversion in the rectangular conversion process by the PC.
Figure 7B:
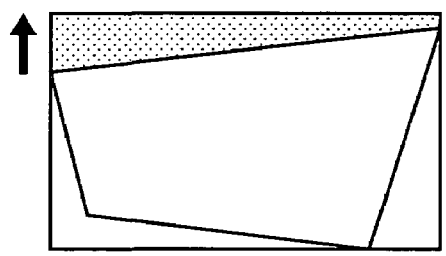
Figure 7C:
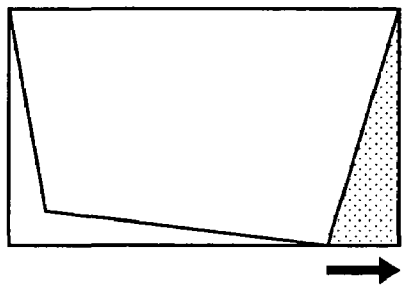
Figure 7D:
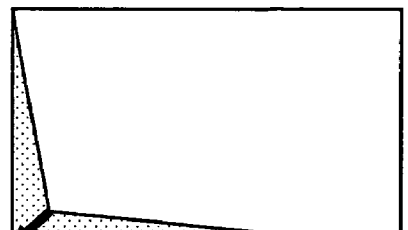
Figure 7E:
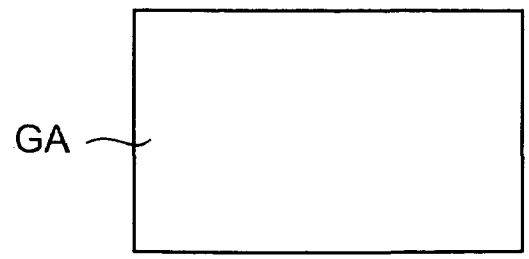

The PC 2 identifies edges in a captured image G1 in accordance with changes in color and luminance (step S111, FIG. 6A). The PC 2 finds straight lines M1 to M4 which are close to four sides L1 to L4 of the outer circumference of the captured image G1 from the identified edges (step S112, FIG. 6B). The PC 2 further finds intersections of the straight lines M1 to M4, i.e., four vertexes (step S113). The PC 2 regards the quadrangle formed by the four vertexes as a written material region GA in the captured image G1, as shown in FIGS. 7A to 7E. Then, the PC 2 converts the shape of the written material region GA in a way that the four vertexes of the region GA are moved to four vertexes of the smallest rectangle B that circumscribes the written material region GA (step S114, FIG. 6C). Due to this, an image G2 which is a result of correcting the deformation of the shape with respect to a rectangle (hereinafter this deformation will be referred to as rectangular deformation) is obtained in the written material region GA. Needless to say, also in the case where the rectangular deformation of the written material region GA is a trapezoidal deformation, this deformation is corrected by the above-described process.

Figure 8:
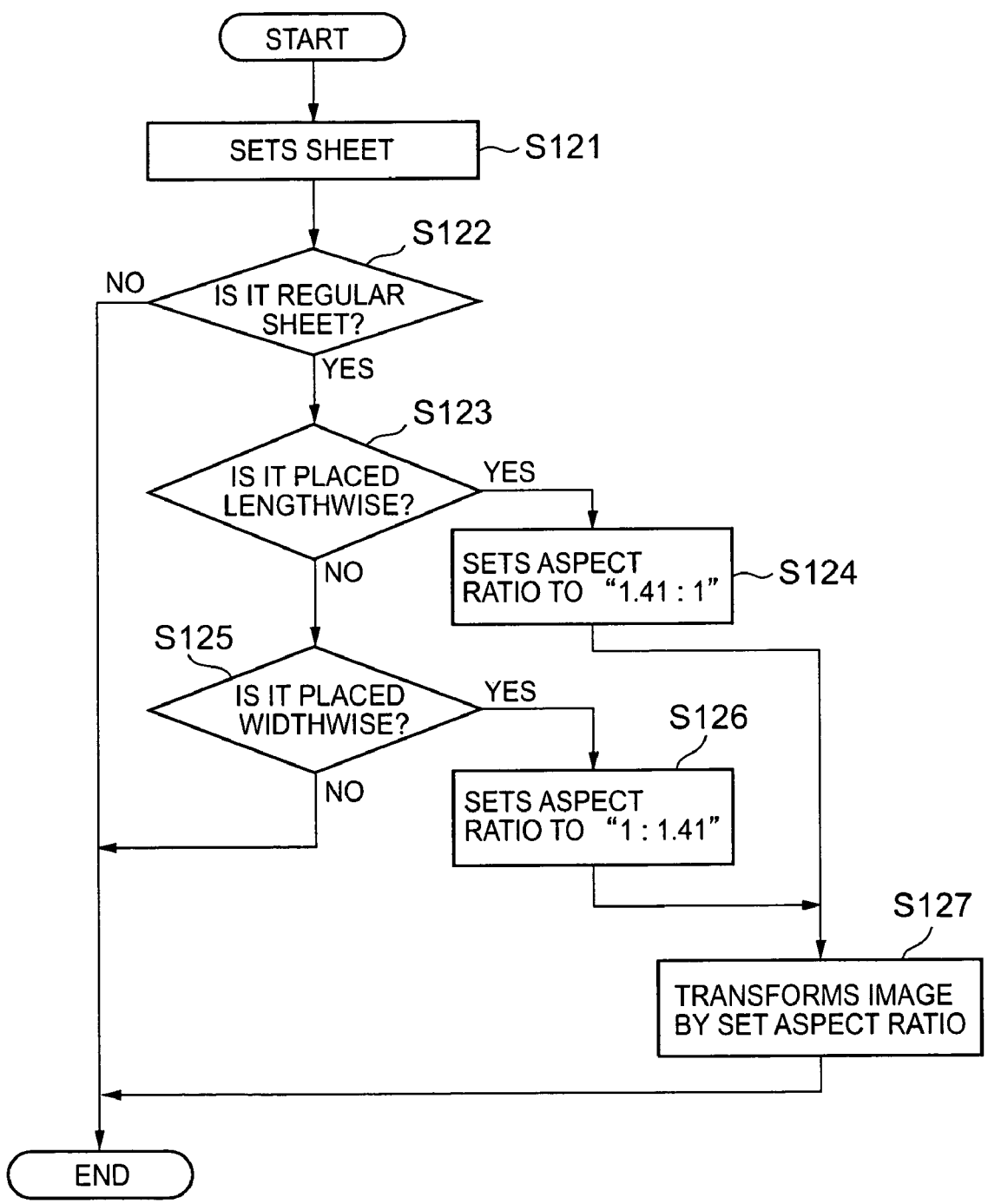
FIG. 8 is a flowchart showing a procedure of an aspect ratio conversion process by the PC.

Subsequently, the PC 2 performs an aspect ratio conversion process, as its procedure being shown in a flowchart of FIG. 8. In this process, upon receiving a user's operation for selecting a sheet, the PC 2 performs setting for the sheet (step S121). If a regular sheet is not selected by the user in this step, the aspect ratio conversion process is terminated. In a case where the regular sheet is selected and the sheet is placed lengthwise (step S122 and step S123: both YES), the PC 2 sets the aspect ratio to "1.41:1" (step S124). In contrast, if the sheet is placed widthwise (step S123: NO, and step S125: YES), the PC 2 sets the aspect ratio to "1:1.41" (step S126).

After this, PC 2 transforms the written material region GA which has been through the rectangular deformation correction, by either of the set aspect ratios (step S127). In this process, the PC 2 performs the transformation based on coordinate data of the four vertexes of the smallest rectangle B used in the conversion (step S114) in the rectangular conversion process explained above. For example, in a case where widthwise placement of a regular sheet is designated, the PC 2 transforms the written material region GA by expanding the region GA in the vertical direction such that the aspect ratio of the region GA will be "1:1.41", as shown in FIG. 9. In a case where lengthwise placement of a regular sheet is designated, the PC 2 transforms the written material region GA by expanding the region GA in the horizontal direction such that the aspect ratio will be "1.41:1". As a result, the PC 2 obtains an image G3 in which the written material region GA has the aspect ratio of the regular sheet.

Figure 10:
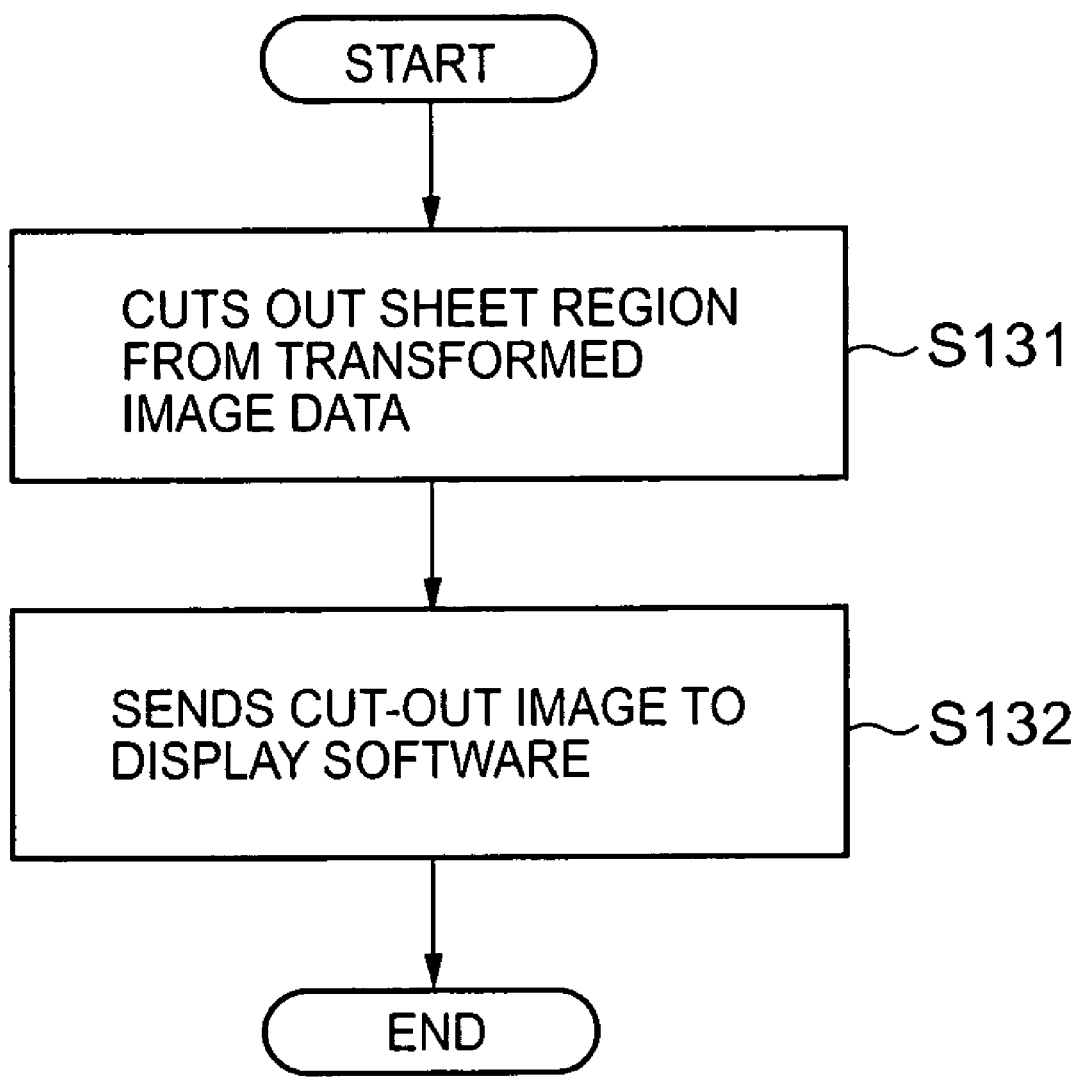
FIG. 10 is a flowchart showing an-operation of the PC after the aspect ratio conversion process by the PC is completed.

After this, as shown in a flowchart of FIG. 10, the PC 2 cuts out the region corresponding to the sheet from the image G3 which has been subjected to the above-described transformation based on the coordinate data of the four vertexes of the smallest rectangle B used in the conversion (step S114) in the rectangular conversion process as shown in FIG. 11 (step S131). Then, the PC 2 sends an image G4 obtained after adjustment which consists of only the cut-out image, i.e., the written material region GA to the display software (step S132), so that the image G4 will be displayed on the display device 25.

Due to this, when the written material A is image-captured by the calligraphy/drawing camera 3 and projected on the screen S, a fine captured image having no rectangular deformation and no unnecessary frame image can be projected on the screen S.

Second Embodiment

Next, the second embodiment of the present invention will be explained. In the present embodiment, unlike the first embodiment, the captured image projection apparatus having the same structure as that shown in FIG. 1 to FIG. 3 detects whether the written material A in the captured image is placed lengthwise or widthwise when adjusting the captured image of the written material A.

In the present embodiment, the PC 2 has a function for obtaining the angle of the lenz of calligraphy/drawing camera 3 at which the written material A fully falls-within the image range of camera 3 at the time the written material A is image-captured (this angle will hereinafter be referred to as angle of view), and for obtaining the resolution of the image output from the calligraphy/drawing camera 3. In the storage device 23 of the PC 2, a program for controlling the PC 2 to perform a direction detection process to be described below is stored.

Figure 12:
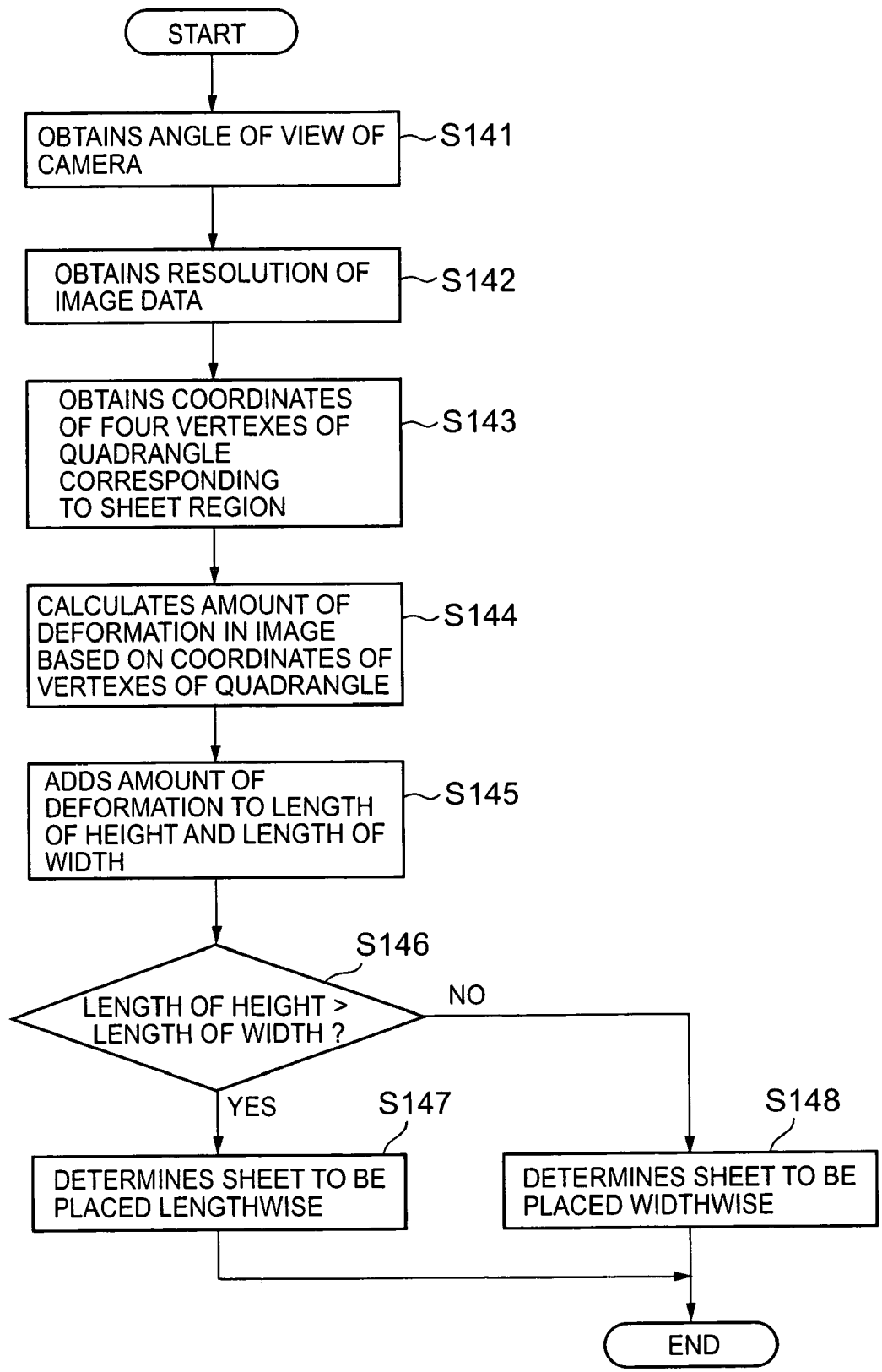
FIG. 12 is a flowchart showing the content of a direction detection process by the PC in the second embodiment.

The direction detection process by the PC 2 will now be explained with reference to a flowchart shown in FIG. 12. The PC 2 first obtains the angle of view of the calligraphy/drawing camera 3 (step S141). Then, the PC 2 obtains the resolution of the image data (step S142). Subsequently, the PC 2 obtains four vertexes of the quadrangle corresponding to the sheet (written material region GA) from the captured image (step S143). This process is the same as the process in the rectangular conversion process (see FIG. 5) explained in the first embodiment.

Figure 13A:
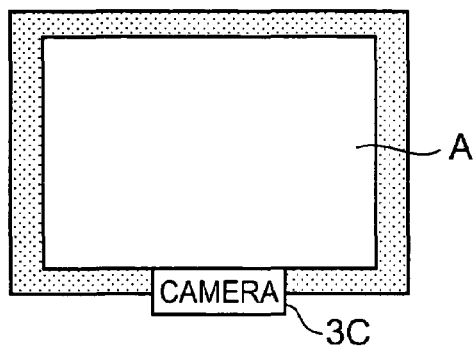
FIGS. 13A to 13C are explanatory diagrams showing a reason why a deformation is produced in a captured image, and a state where a deformation is produced.
Figure 13B:
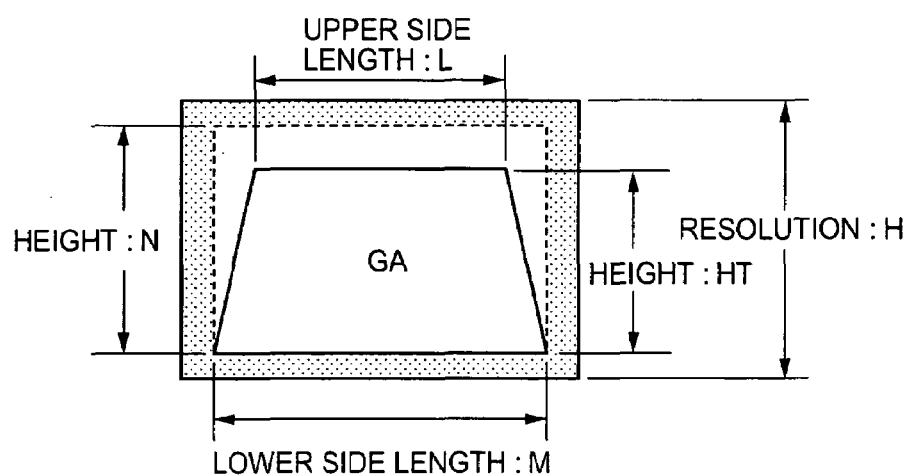

Next, the PC 2 calculates the amount of deformation in the image based on the coordinates of the obtained four vertexes by using the formerly obtained angle of view and resolution (step S144). The calculation method for this process will now be explained. Generally, deformation in an image is produced if the sheet (written material A) is image-captured obliquely in a state where the camera 3C of the calligraphy/drawing camera 3 is positioned off the sheet when the sheet is seen from right above, as shown in FIG. 13A. In the captured image, the region corresponding to the sheet (written material region GA) appears as a trapezoid as shown in FIG. 13B. The calligraphy/drawing camera 3 seen from the side at this time is as shown in FIG. 13C.

Figure 13C:
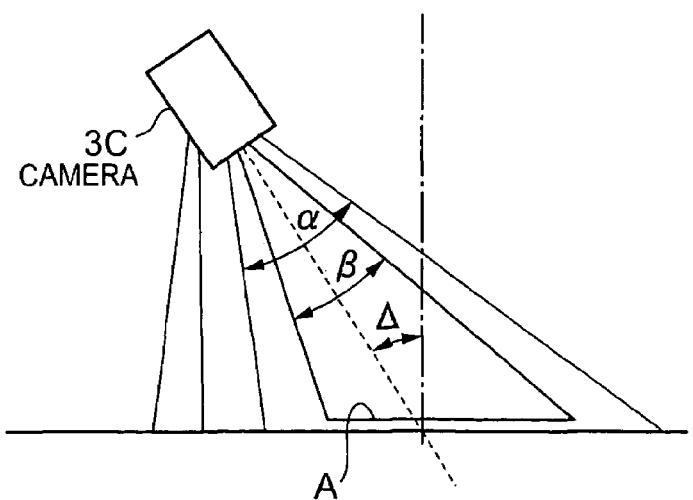

As illustrated in FIGS. 13A to 13C, in a case where the angle of view of the camera is represented by α, the resolution of the image is represented by H (pixel value), the length of the upper side of the sheet region is represented by L (pixel value), the length of the lower side of the sheet region is represented by M (pixel value), and the height of the sheet region is represented by HT (pixel value), the angle β within the angle of view corresponding to the sheet region is represented by β=α×HT/H, and the slope of the camera is represented by Δ.

In this case, [Expression 1] indicated below is established.

$$\frac{L}{M} = \frac{\cos(\beta + \Delta)}{\cos(\beta - \Delta)} \qquad \text{[Expression 1]}$$

Δ is derived from [Expression 1].

After Δ is derived, the height N of the sheet with respect to the lower side length M is derived from [Expression 2] indicated below.

$$N = HT * \frac{\tan(\beta + \Delta) + \tan(\beta - \Delta)}{\tan(\beta) * 2} \qquad \text{[Expression 2]}$$

Then, the PC 2 adds the amount of deformation calculated in the manner described above to the length of height and length of width of the sheet region respectively (step S145). After this addition, if the length of height is larger than the length of width (step S146:YES), the PC 2 determines that the written material A is placed lengthwise (step S147). On the contrary, if the length of height is not larger than the length of width (step S146: NO), the PC 2 determines that the written material A is placed widthwise (step S148).

As explained above, according to the present embodiment, it can be automatically detected whether the written material A is placed lengthwise or widthwise. Accordingly, the above-described adjustment of the captured image can be performed without the user's designation of the orientation of the written material A.

Third Embodiment

Next, the third embodiment of the present invention will be explained. The present embodiment relates to a method of a captured image projection apparatus having the same configuration as that shown in FIG. 1 to FIG. 3, for automatically obtaining an image capturing angle used for adjusting a captured image of the aforementioned written material A. In the present embodiment, the PC 2 has a function for obtaining the angle of view of the calligraphy/drawing camera 3 at the time the written material A is image-captured, and the resolution of the image output from the calligraphy/drawing camera 3. Further, a program for controlling the PC 2 to perform a later-described inclination measuring process is stored in the storage device 23 of the PC 2.

Figure 14:
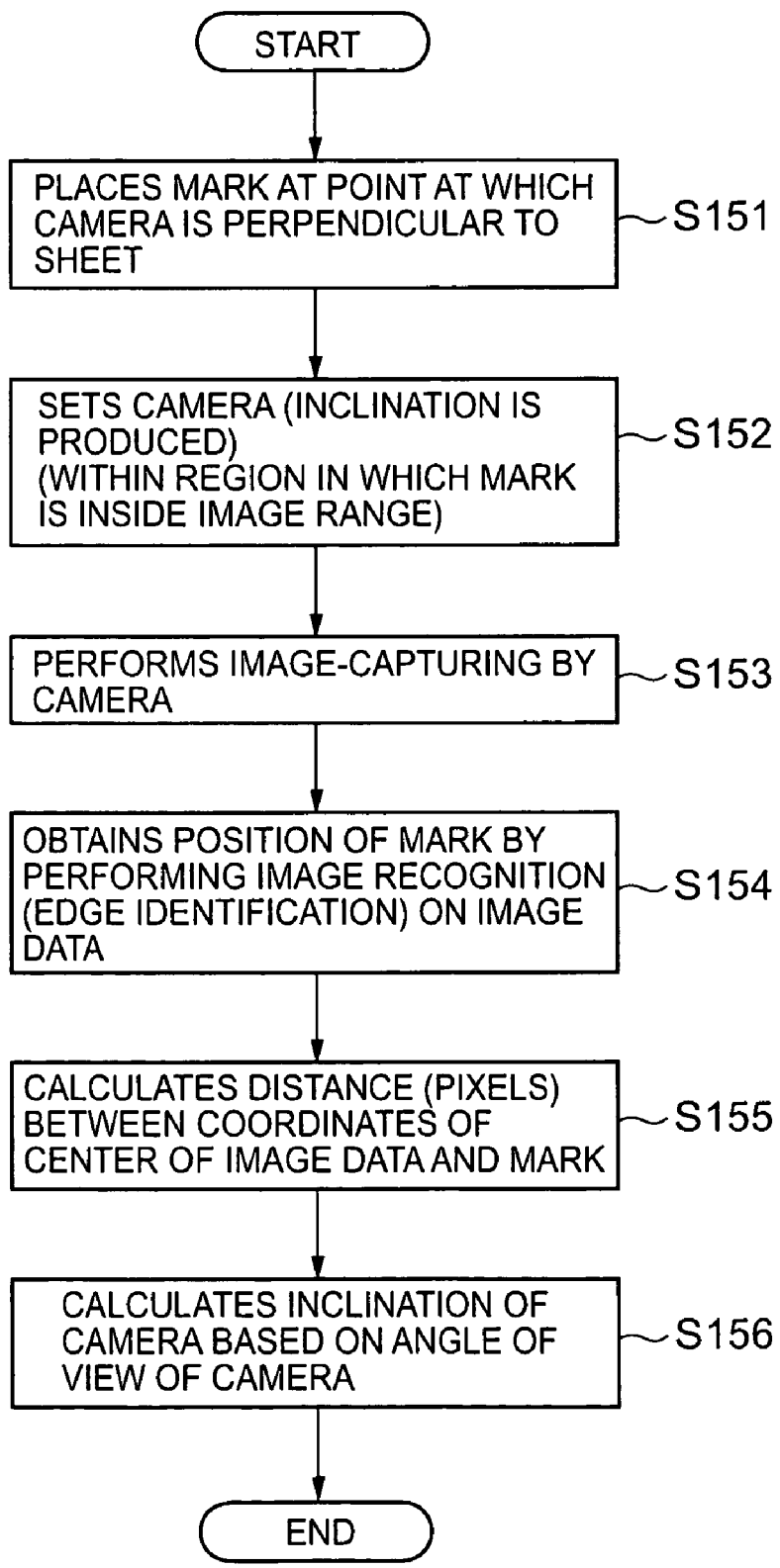
FIG. 14 is a flowchart showing a procedure for obtaining an image capturing angle according to the third embodiment.

Next, the procedure of the captured image projection apparatus for obtaining the image capturing angle will be explained with reference to a flowchart shown in FIG. 14. Note that steps S151 to S153 are performed by user's operations and steps S154 to S156 are performed by the PC 2 (automatically). First, as a preparatory step, the user places a specific mark M at a point reached by drawing a vertical line VL from the camera 3C of the calligraphy/drawing camera 3 to the camera mounting 3A (step S151), as shown in FIGS. 15A and 15B. FIG. 15A is a front view showing the state of the calligraphy/drawing camera 3 where the mark M is placed, and FIG. 15B is a left side view of the calligraphy/drawing camera 3 in the same state. Next, the user sets the orientation of the camera 3C in a manner that the mark M appears within the image range of the camera 3C (step S152), and image-captures the camera mounting 3A in this state (step S153). Subsequently, the user operates the PC 2 to start the inclination measuring process. The PC 2 performs edge identification on a captured image G1, and obtains the position of the mark M (step S154). Note that the positional data to be obtained represents coordinate values pixel-wise. Then, the PC 2 calculates the distance (number of pixels) between the coordinates of the center of the captured image G1 and the mark M (step S155). After this; the PC 2 calculates the inclination of the camera 3C, i.e., the image capturing angle with respect to the upper surface of the camera mounting 3A, based on the angle of view of the calligraphy/drawing camera 3 (step S156).

Angle calculation at this time is performed in the manner described below. In a case where, as shown in FIG. 15B,
the angle of view of the camera is represented by α,
the length of a circular arc AB is represented by L, and
the length of a circular arc CD is represented by M,
the inclination (image capturing angle Δ) of the camera 3C to be calculated is represented by (Δ)=α×M/L.

Further, the length (L) of the circular arc AB and the length (M) of the circular arc CD correspond to the line segment EF and line segment GH of the captured image G1, respectively. Therefore, the inclination (Δ) of the camera 3C is derived by Inclination (Δ)=α×line segment *EF*/line segment *GH*.

Accordingly, in the present embodiment, the captured image projection apparatus can adjust the captured image by using the image capturing angle (Δ) obtained in the manner described above. That is, the captured image projection apparatus carries out trapezoidal correction in the vertical direction and in the horizontal direction on the captured image of the written material A placed on the camera mounting 3A, by using the image capturing angle (Δ). Due to this, the same image as that which is obtained when the written material A is image-captured vertically can be obtained.

Fourth Embodiment

Next, the fourth embodiment of the present invention will be explained. The present embodiment relates to a method of the captured image projection apparatus having the same configuration as that shown in FIG. 1 to FIG. 3, for automatically obtaining an image capturing angle used for adjusting a captured image of the written material A in a different manner from the third embodiment. In the captured image projection apparatus of the present embodiment, the calligraphy/drawing camera 3 can allow the height of the camera 3C to be arbitrarily adjusted with respect to the camera mounting 3A, and the PC 2 can obtain information regarding the height. Further, a program for controlling the. PC 2 to perform a later-described inclination measuring process is stored in the storage device 23 of the PC 2.

Figure 16:
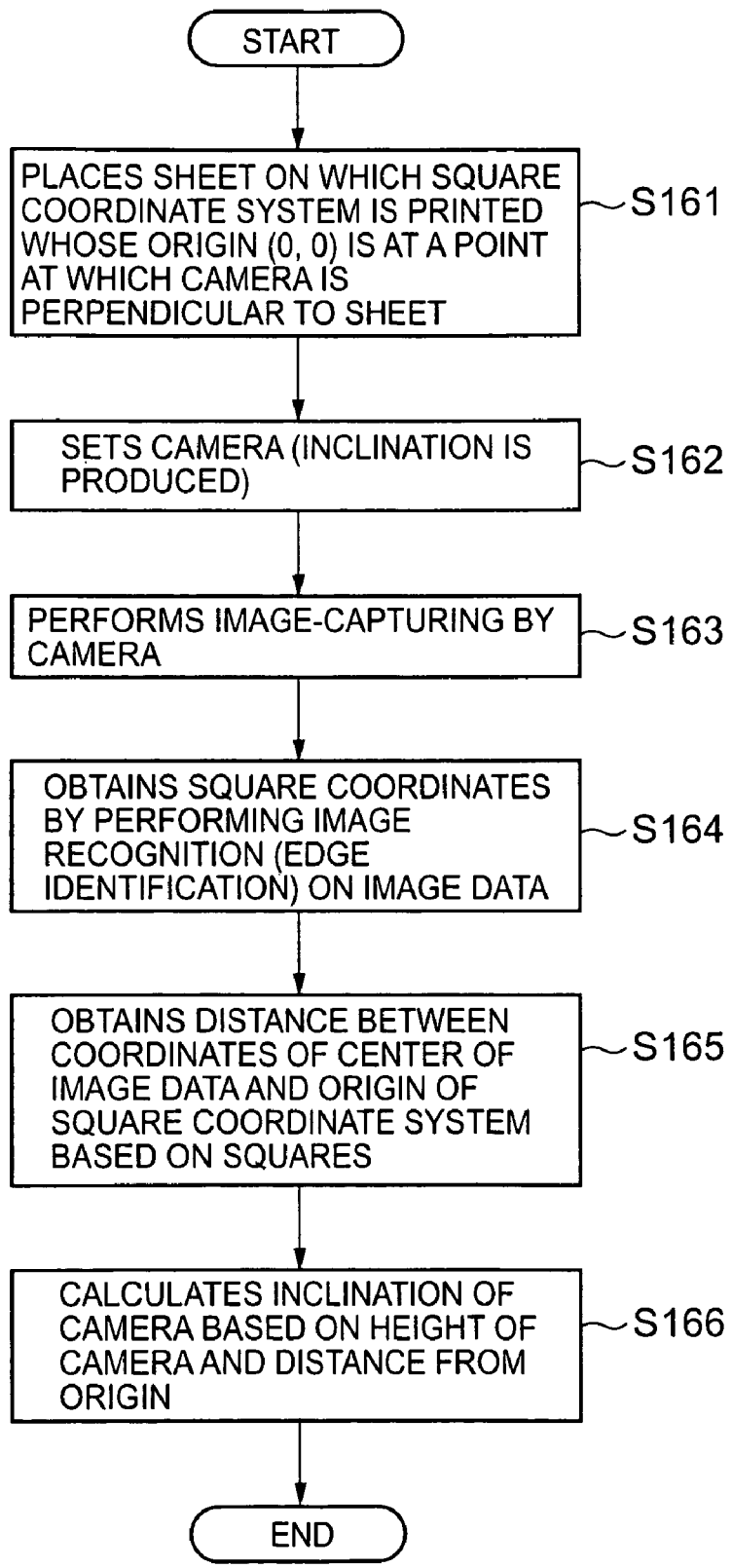
FIG. 16 is a flowchart showing a procedure for obtaining a image capturing angle according to the fourth embodiment.

The procedure of the captured image projection apparatus for obtaining the image capturing angle in the present embodiment will be explained with reference to a flowchart shown in FIG. 16. Note that steps S161 to S163 are performed by users operation, and steps S164 to S166 are performed by the PC 2 (automatically). First, as a preparatory step, the user prepares a sheet (reference sheet) T on which squares representing an X-Y coordinate system are printed, as shown in FIGS. 17A and 17B. The user places the sheet on the camera mounting 3A of the calligraphy/drawing camera 3, and adjusts the position of the sheet such that the point reached by drawing a vertical line VL from the camera 3C is the origin O (0, 0) (step S161). FIG. 17A is a front view showing the state of the calligraphy/drawing camera 3 where the sheet is placed at the right position, and FIG. 17B is a left side view of the calligraphy/drawing camera 3 in the same state. The user arbitrarily sets the orientation of the camera 3C (step S162), and image-captures the sheet T in this state (step S163). Then, the user operates the PC 2 to start the inclination measuring process. The PC 2 first performs edge identification on a captured image G1 and obtains the coordinates of the edges on the squares (step S164). Then, the PC 2 obtains the distance between the coordinates of the center of the captured image G1 and the origin O of the square coordinates by the number of pixels (step S165). Then, the PC 2 calculates the image capturing angle based on the distance and the height of the camera 3C (step S166).

The calculation of the angle is performed in the manner described below. In FIG. 17B, in a case where
the height of the camera is represented by H, and
the shift amount (distance between the coordinates of the center of the captured image G1 and the origin O of the square coordinates) is represented by W,
the inclination (image capturing angle) $\Delta$ of the camera 3C is derived by inclination $\Delta = \arctan(W/H)$.

Therefore, according to the present embodiment, the captured image can be adjusted by using the image capturing angle ($\Delta$) obtained in the manner described above. That is, the captured image projection apparatus performs trapezoidal correction in the vertical direction and in the horizontal direction on the captured image of the written material A placed on the camera mounting 3A, by using the image capturing angle ($\Delta$). Due to this, the same image as that which is obtained when the written material A is image-captured vertically can be obtained.

Fifth Embodiment

The fifth embodiment of the present invention will now be explained. The present embodiment relates to a method of the captured image projection apparatus having the same configuration as that shown in FIG. 1 to FIG. 3, for correcting the orientation of the captured image of the written material A, which is due to a difference in orientation (inclination in a rotary direction) between the written material A and the camera 3C. A program for controlling the PC 2 to perform a later-described rotation correction process is stored in the storage device 23 of the PC 2.

Figure 18:
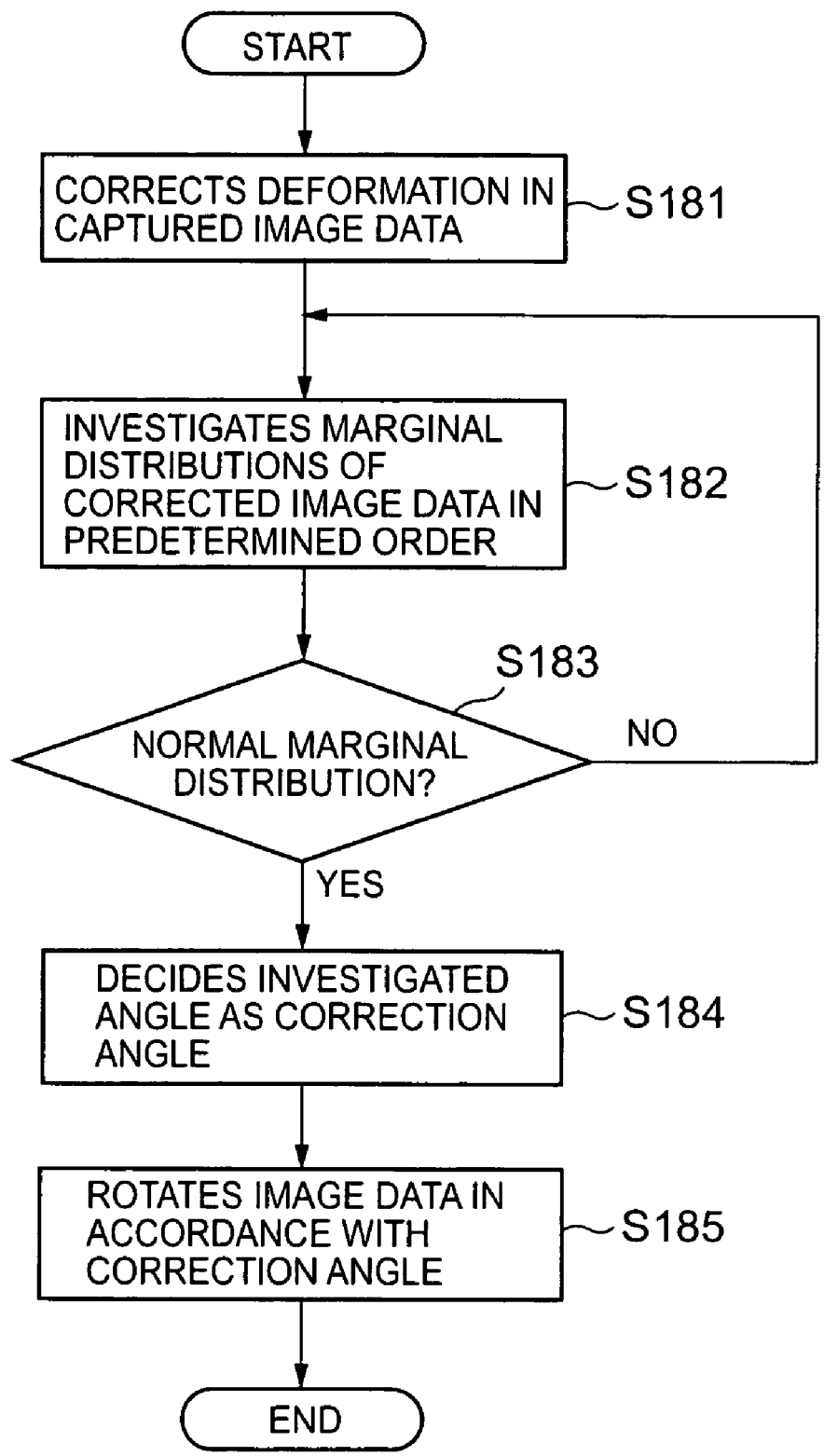
FIG. 18 is a flowchart showing a procedure of a rotation correction process by the PC according to the fifth embodiment.
Figure 19:
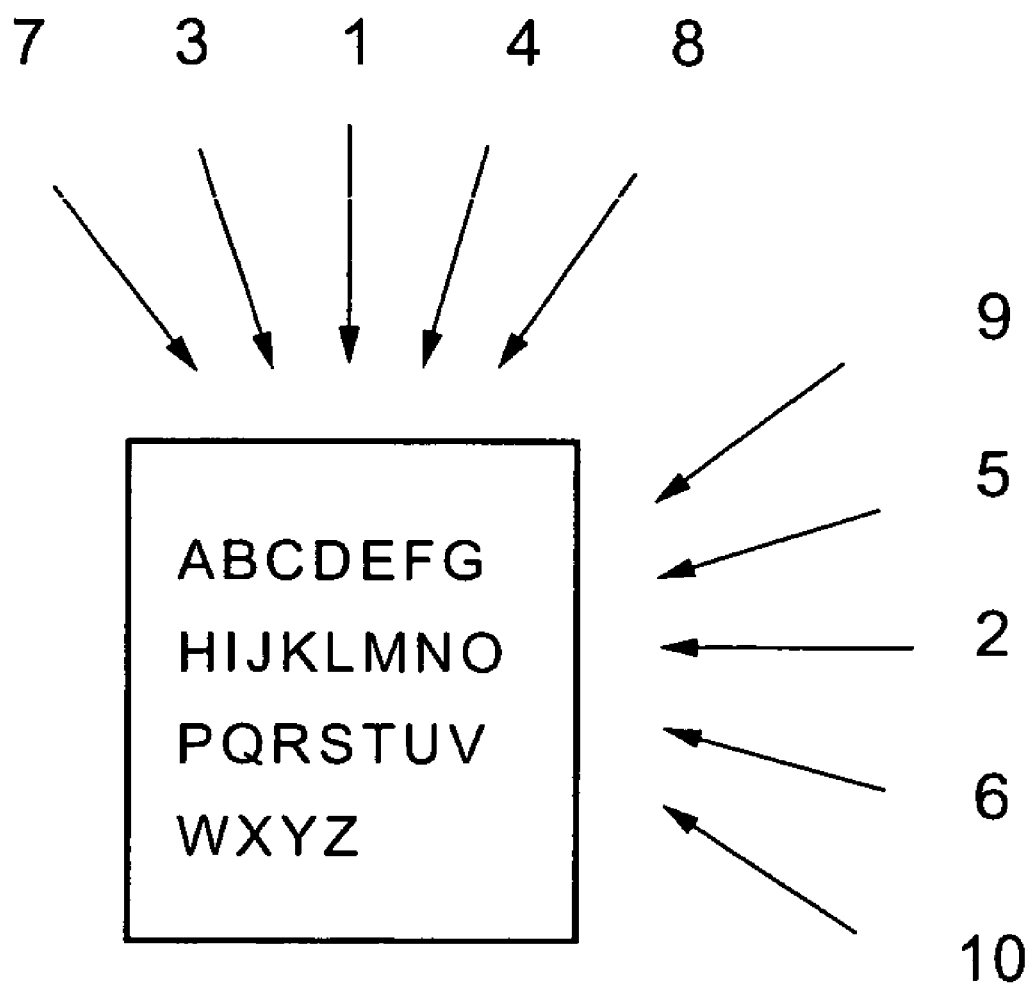
FIG. 19 is an explanatory diagram showing an order of scanning directions to a captured image.
Figure 20A:
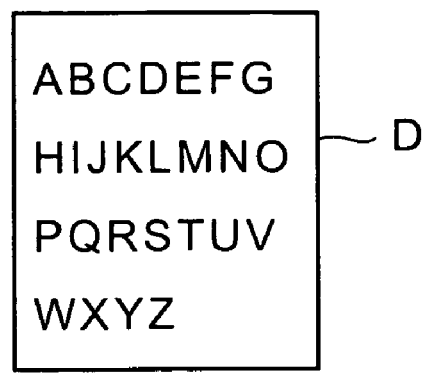
FIGS. 20A and 20B are exemplary diagrams showing a relation among a document, a scanning direction, and a marginal distribution.
Figure 20B:
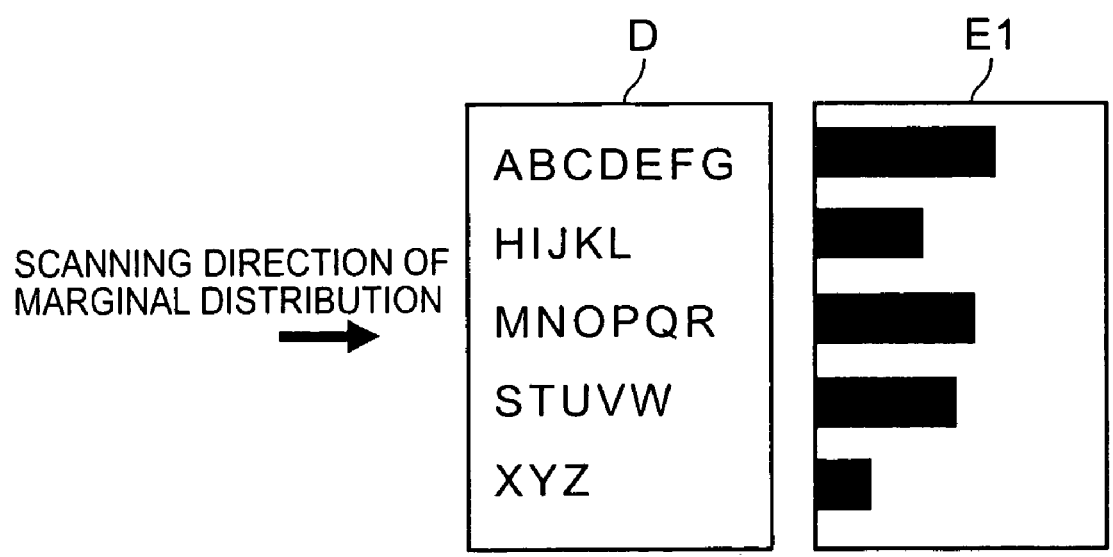
Figure 21A:
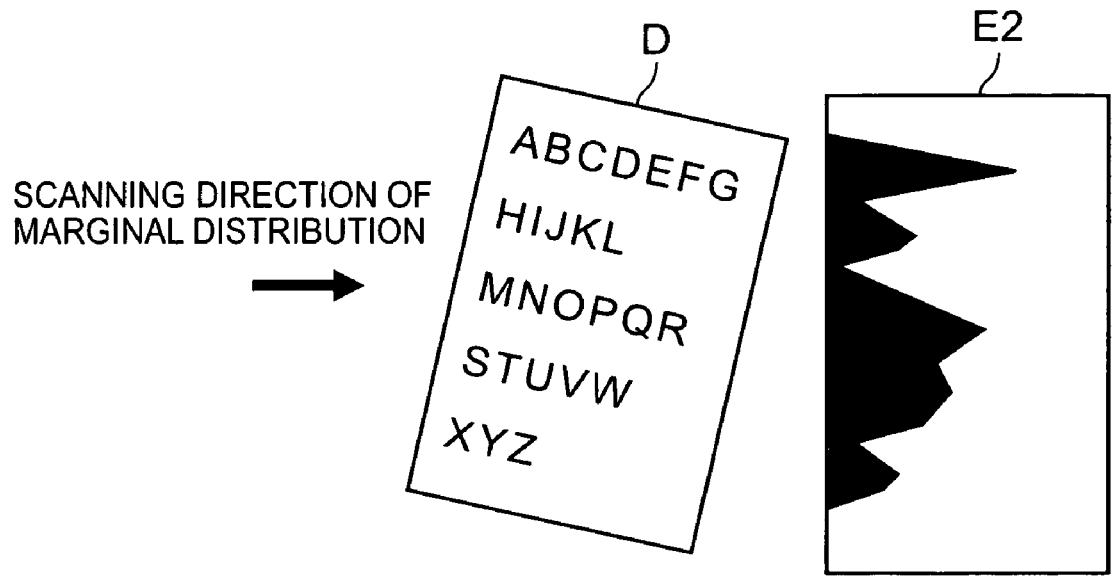
FIGS. 21A and 21B are exemplary diagrams showing a relation among a document, scanning direction, and a marginal distribution in a case where the marginal distribution is not normal.

The procedure of the rotation correction process by the PC 2 will be explained with reference to a flowchart shown in FIG. 18. The PC 2 corrects the rectangular deformation in the captured image input from the calligraphy/drawing camera 3, in accordance with, for example, the method explained in the first embodiment (step S181). Then, the PC 2 investigates the marginal distribution of the character strings in the corrected captured image in different scanning directions, in a predetermined order shown in FIG. 19 (step S182). Then, the PC 2 checks whether the obtained marginal distribution is a normal distribution or not each time the marginal distribution in one of the different scanning directions is obtained (step S183). In a case where the document (character strings) in the written material A is as shown in FIG. 20A, a normal marginal distribution E1 as shown in FIG. 20B can be obtained if the captured image is not rotated with respect to the scanning direction. In a case where the captured image is rotated with respect to the scanning direction, a not normal marginal distribution E2 as shown in FIG. 21A is obtained.

Figure 21B:
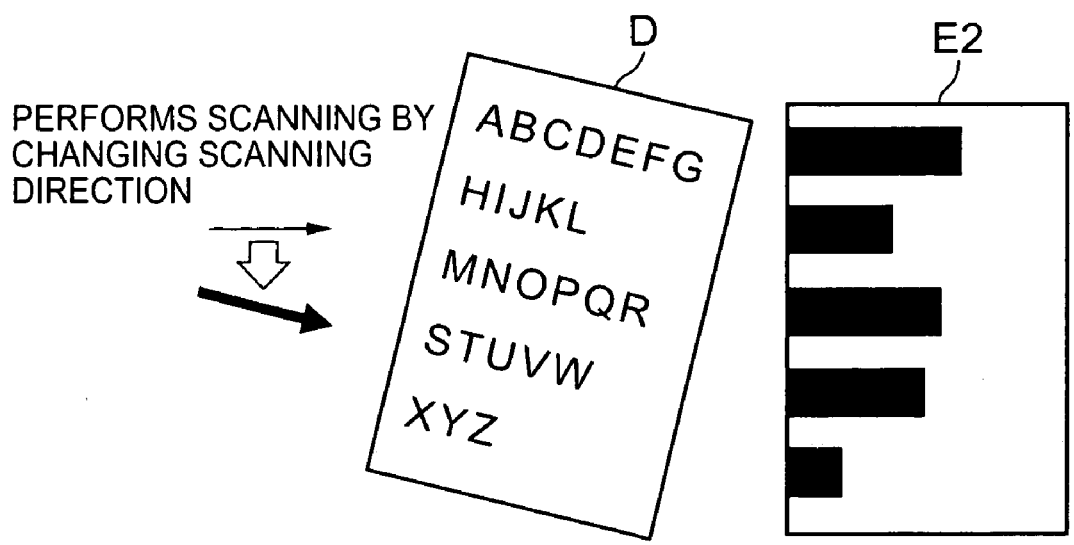

When a normal marginal distribution E is obtained in any scanning line (step S183: YES, FIG. 21B), the PC 2 decides the angle of the scanning direction at this time as a correction angle (step S184). After this, the PC 2 corrects the orientation of the captured image by rotating the captured image by the correction angle (step S185). Due to this, the captured image projection apparatus can adjust the captured image such that the document D becomes horizontal with no inclination as shown in FIG. 20A. Generally, documents are written in roughly two different manners, namely, a vertical writing manner and a horizontal writing manner (the manner shown in the drawings). For example, if the document is vertically written, the captured image can be adjusted in a way that the character strings become vertical.

Sixth Embodiment

Next, the sixth embodiment of the present invention will be explained. The present embodiment relates to a method of the captured image projection apparatus having the same configuration as that shown in FIG. 1 to FIG. 3, for correcting the orientation of the captured image of the written material A, which is due to a difference in orientation (inclination in a rotary direction) between the written material A and the camera 3C, in a different manner from the fifth embodiment. A program for controlling the PC 2 to perform a later-described rotation correction process is stored in the storage device 23 of the PC 2.

Figure 22:
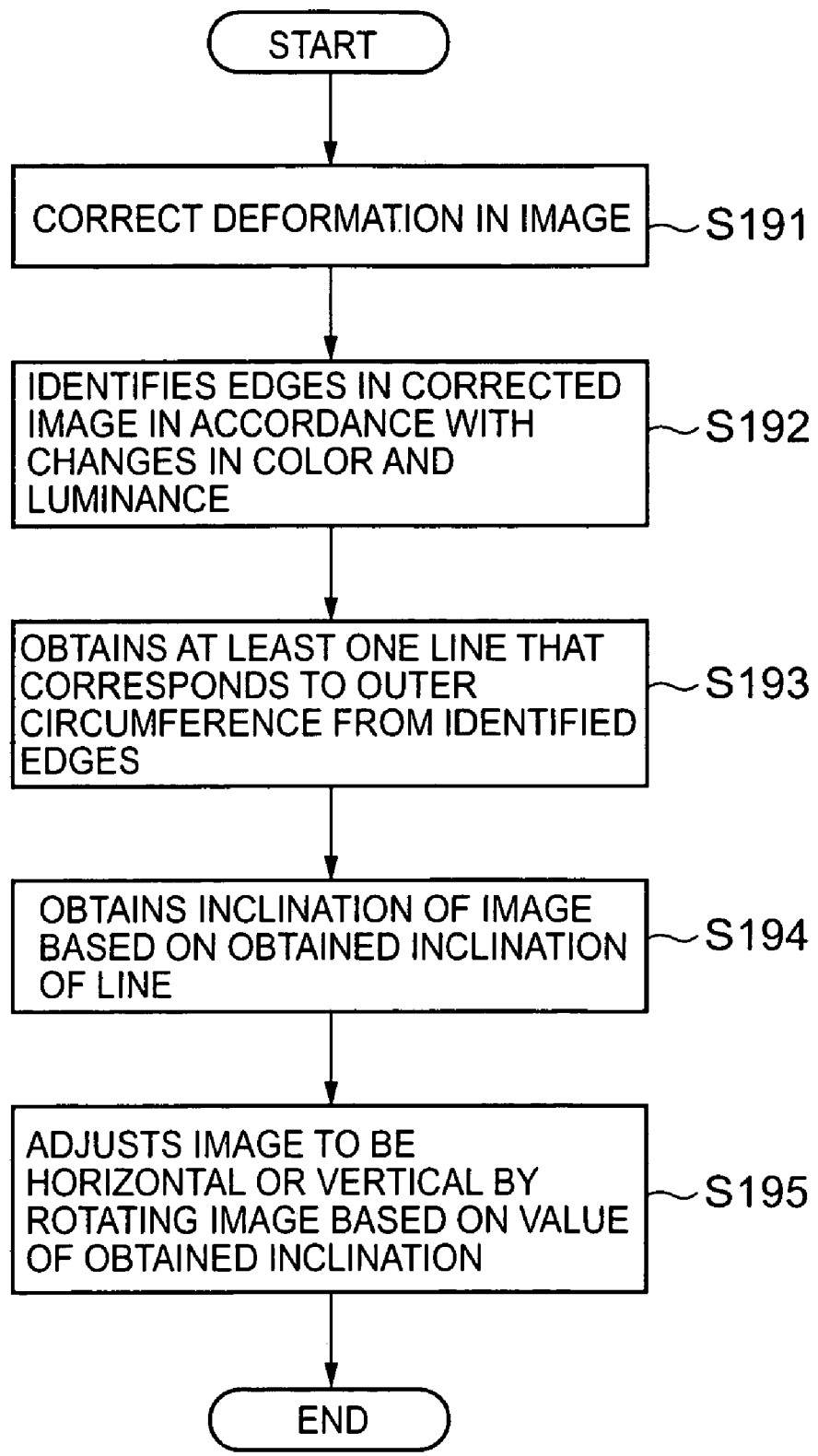
FIG. 22 is a flowchart showing a procedure of a rotation correction process by the PC according to the sixth embodiment.
Figure 23A:
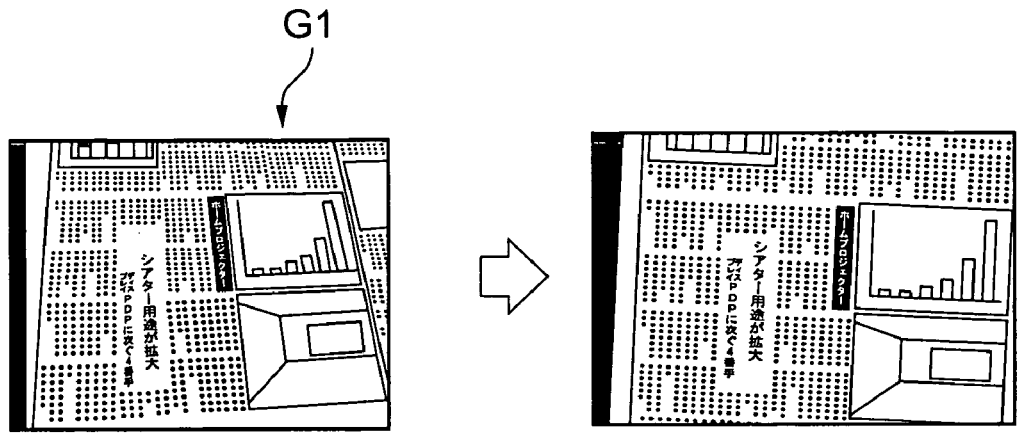
FIGS. 23A to 23C are explanatory diagrams of the rotation correction process by the PC according to the sixth embodiment.
Figure 23B:
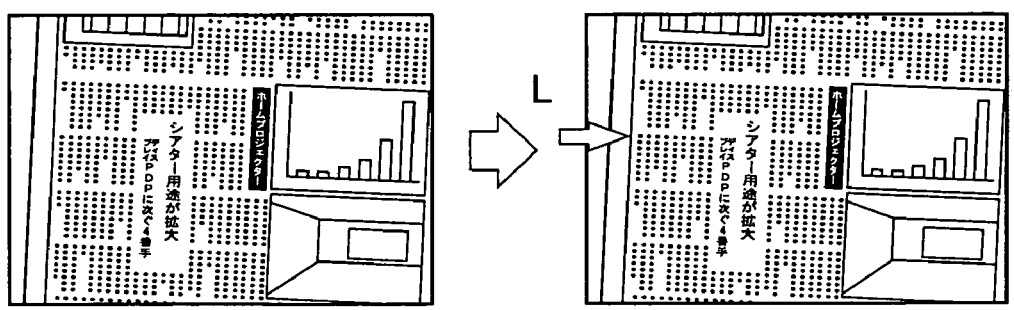
Figure 23C:
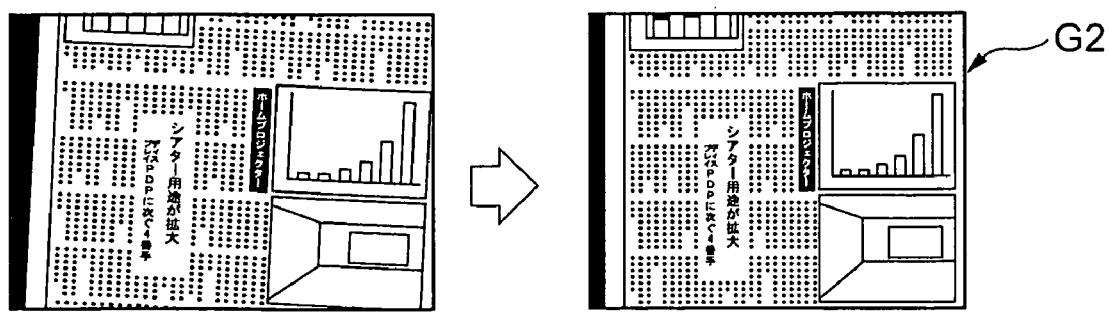

The procedure of the rotation correction process by the PC 2 will be explained with reference to a flowchart shown in FIG. 22. The PC 2 first corrects the rectangular deformation in a captured image G1 input from the calligraphy/drawing camera 3 in accordance with, for example, the method explained in the first embodiment (step S191, FIG. 23A). Then, the PC 2 identifies any edges in the corrected captured image in accordance with changes in color and luminance (step S192). Then, the PC 2 finds at least one line L which corresponds to the outer circumference from the identified edges (step S193, FIG. 23B). Subsequently, the PC 2 obtains the inclination of the image based on the line L (step S194). The inclination obtained in this step includes the smaller one of the angle of the line L to a vertical line and angle of the line L to a horizontal line, and the rotation direction of the angle. The PC 2 adjusts the captured image G1 to be vertical or horizontal by rotating the captured image G1 based on the obtained inclination value (angle and rotation direction) (step S195, FIG. 23C).

Accordingly, even if the written material A is not a document, and moreover, is a picture or a photograph including no characters, the captured image projection apparatus can automatically obtain an adjusted captured image G2, by image-capturing the written material A in such a way that one of the material's sides is included in the captured image.

Seventh Embodiment

Next, the seventh embodiment of the present invention will be explained. The present embodiment relates to a method of the captured image projection apparatus having the same configuration as that shown in FIG. 1 to FIG. 3, for correcting the orientation of the captured image of the written material A, which is due to a difference in orientation (inclination in a rotary direction) between the written material A and the camera 3C, in a different manner from the fifth embodiment and sixth embodiment. A program for controlling the PC 2 to perform a later-described rotation correction process is stored in the storage device 23 of the PC 2. Further, a predetermined character recognition program involving the use of an OCR (Optical Character Reader), etc. for extracting and recognizing characters from an image is stored in the storage device 23.

Figure 24:
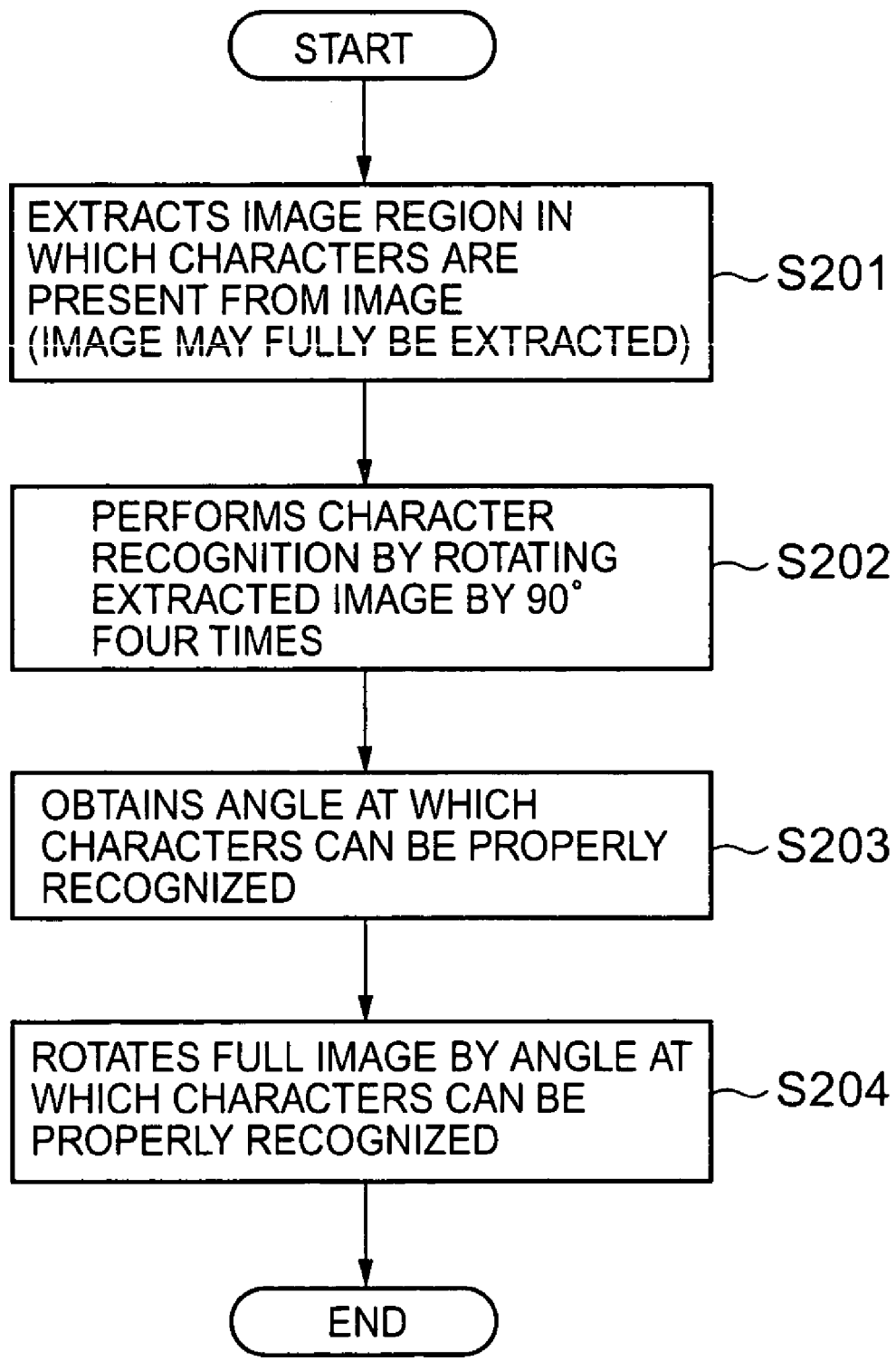
FIG. 24 is a flowchart showing a procedure of a rotation correction process by the PC according to the seventh embodiment.
Figure 25A:
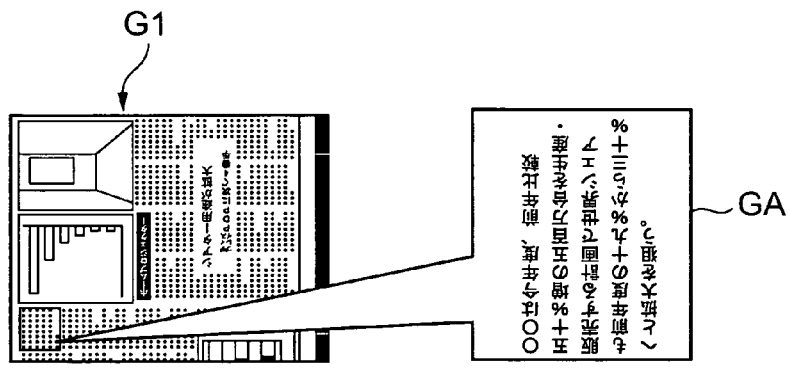
FIGS. 25A to 25C are explanatory diagrams of the rotation correction process by the PC according to the seventh embodiment.
Figure 25B:
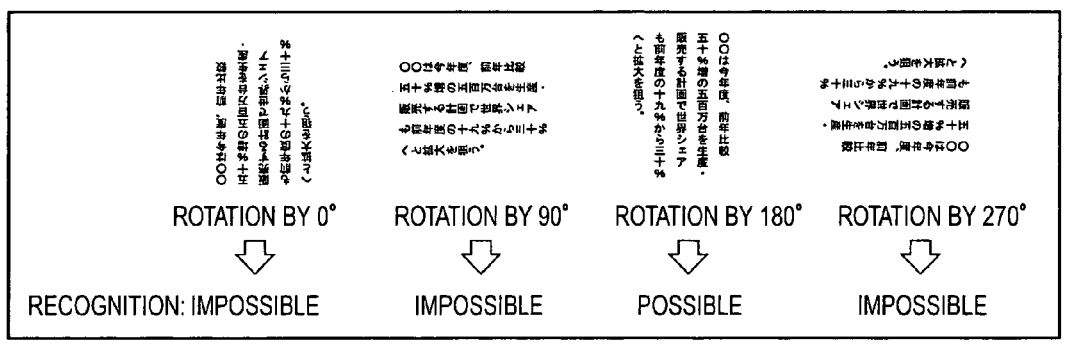
Figure 25C:
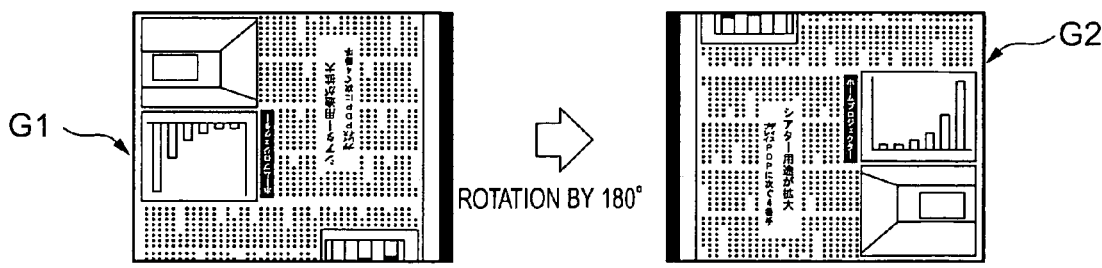

The procedure of the rotation correction process by the PC 2 will be explained with reference to a flowchart shown in FIG. 24. The PC 2 extracts an image region Ga in which characters are present, from a captured image G1 after being subjected to correction of rectangular deformation in accordance with, for example, the method explained in the first embodiment (step S201, FIG. 25A). This step may be omitted by regarding the full captured image G1 as a region in which characters are present. Then, the PC 2 performs character recognition by rotating the extracted region Ga stepwise four times by 90° each time (step S202), and obtains the angle at which the characters can be properly recognized (step S203, FIG. 25B). The extraction of the image region Ga and the recognition of the characters are performed by reading the above-described character recognition program from the storage device 23. The PC 2 rotates the entire captured image G1 by the obtained angle (step S204, FIG. 25C). Therefore, according to the resent embodiment, the captured image projection apparatus can obtain an adjusted captured image G2 in which the orientation of the characters is proper.

Eighth Embodiment

The eight embodiment of the present invention will now be explained. According to the present embodiment, the captured image projection apparatus having the same configuration as that shown in FIG. 1 to FIG. 3 performs the process shown in a flowchart of FIG. 26 in order to adjust a captured image of the written material A. A program for this process is stored in the storage device 23 of the PC 2.

Figure 27A:
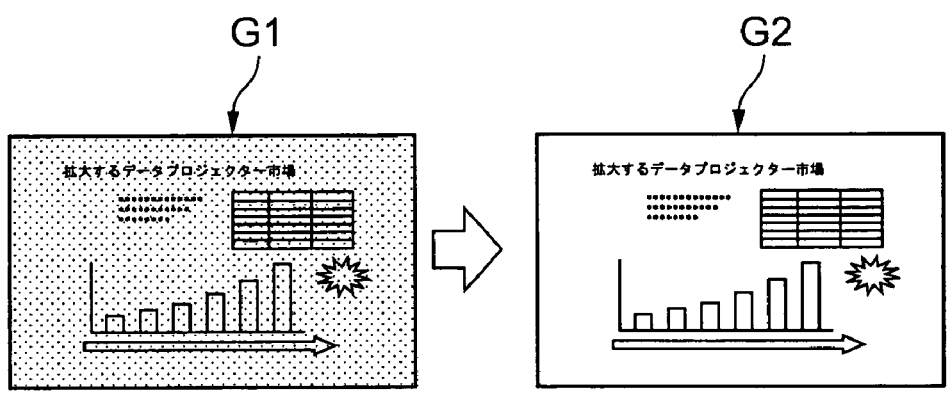
FIGS. 27A and 27B are explanatory diagrams showing the operation of the PC according to the eighth embodiment.

In the present embodiment, the PC 2 first identifies any edges in a captured image G1 in accordance with changes in color and luminance(step S211), and determines whether circumferential four sides can be found in the identified edges. If determining that four sides can be found (step S212: YES), the PC 2 obtains the four circumferential lines from the identified edges and four vertexes in accordance with the method explained in the first embodiment. After this, the PC 2 obtains an image G2 consisting only of a written material region (sheet region) in the captured image G1 in accordance with the process explained in the earlier embodiment (step S213, FIG. 27A).

Figure 27B:
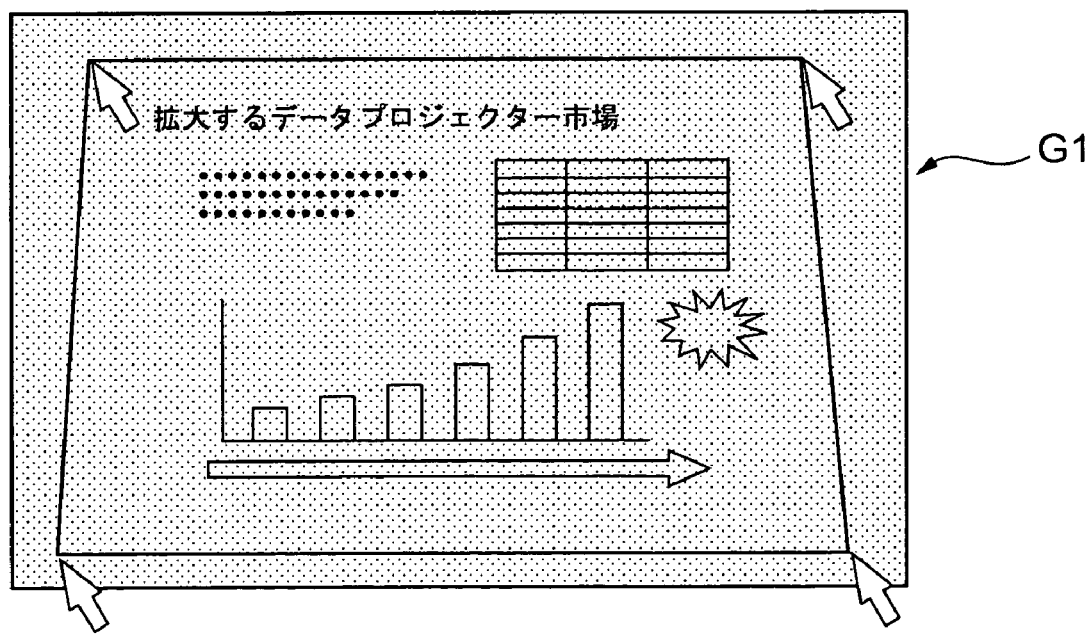

In a case where four sides can not be found, i.e. circumferential four sides can not be recognized in the identified edges (step S212: NO), the PC 2 performs the following process. First, as shown in FIG. 27B, the user directly designates the four vertexes of the sheet region in the captured image G1 by operation of the mouse, etc., in order for the PC 2 to obtain the positions of the four vertexes (step S214). After this, the PC 2 transforms the quadrangle (sheet region) having the four vertexes into the smallest rectangle that circumscribes the quadrangle (step S 215).

Therefore, according to the present embodiment, the captured image projection apparatus can obtain an adjusted captured image G2 by a simple process, even if the difference in color and luminance between the written material region and its surrounding region is small and the circumferential four sides can not be recognized from the identified edges.

Ninth Embodiment

The ninth embodiment of the present invention will be explained. The present embodiment relates to a process of the PC 2 in the captured image projection apparatus according to, for example, the above-described third to seventh embodiments, for cutting out a necessary region from a captured image of a written material A which can not fully fall inside the image region of the camera 3C, after performing correction of rectangular deformation or inclination on this captured image in the manners described above.

Figure 29A:
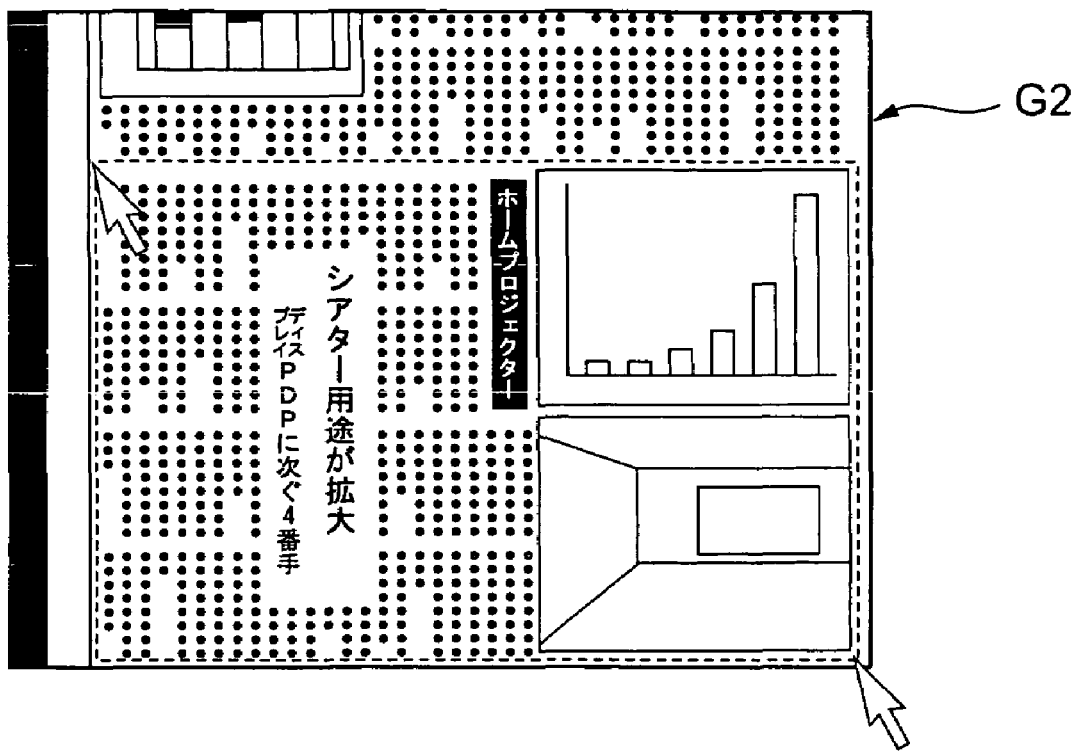
FIGS. 29A and 29B are explanatory diagrams showing the operation of the PC according to the ninth embodiment.
Figure 29B:
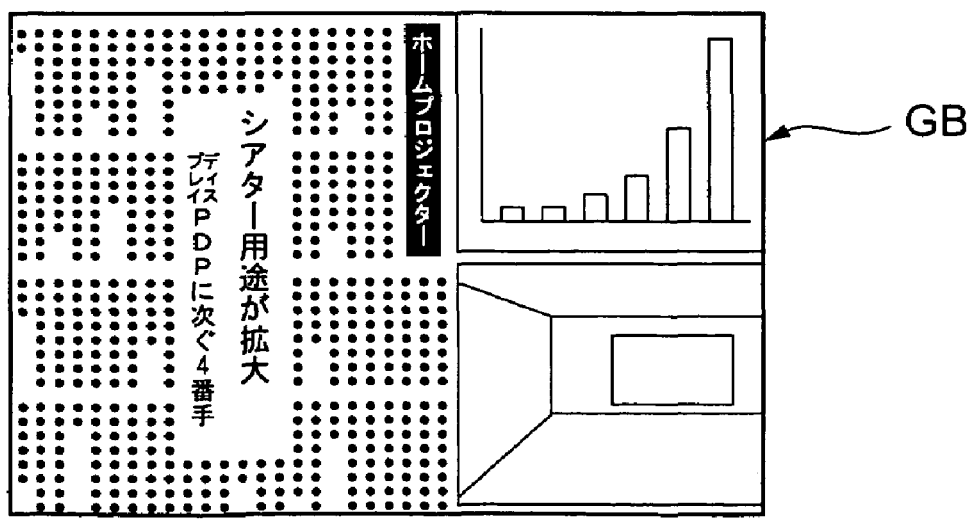

In the present embodiment, as shown in a flowchart of FIG. 28, the PC 2 receives user's designation of a rectangular region corresponding to a necessary region in an image G2 after being corrected (transformed), in accordance with an operation by the user (step S221). The designation of the necessary region is done by user's designating two vertexes on the same diagonal line of the rectangular region which the user wants to project, by operation of the mouse. Then, the PC 2 cuts out the designated region from the image G2 (step S222). Then, the PC 2 sends an image GB representing the cut-out region to the display software (step S223, FIG. 29B), so that the image GB is displayed on the display device 25.

Therefore, final adjustment can be performed on a captured image obtained by image-capturing a written material A which does not fully fall inside the image range.

Tenth Embodiment

The tenth embodiment of the present invention will be explained. The present embodiment also relates to a process of the PC 2 in the captured image projection apparatus according to, for example, the above-described third to seventh embodiments, for cutting out a necessary region from a captured image of a written material A which can not fully fall inside the image region of the camera 3C, after performing correction of rectangular deformation or inclination on this captured image in the manners described above.

Figure 30:
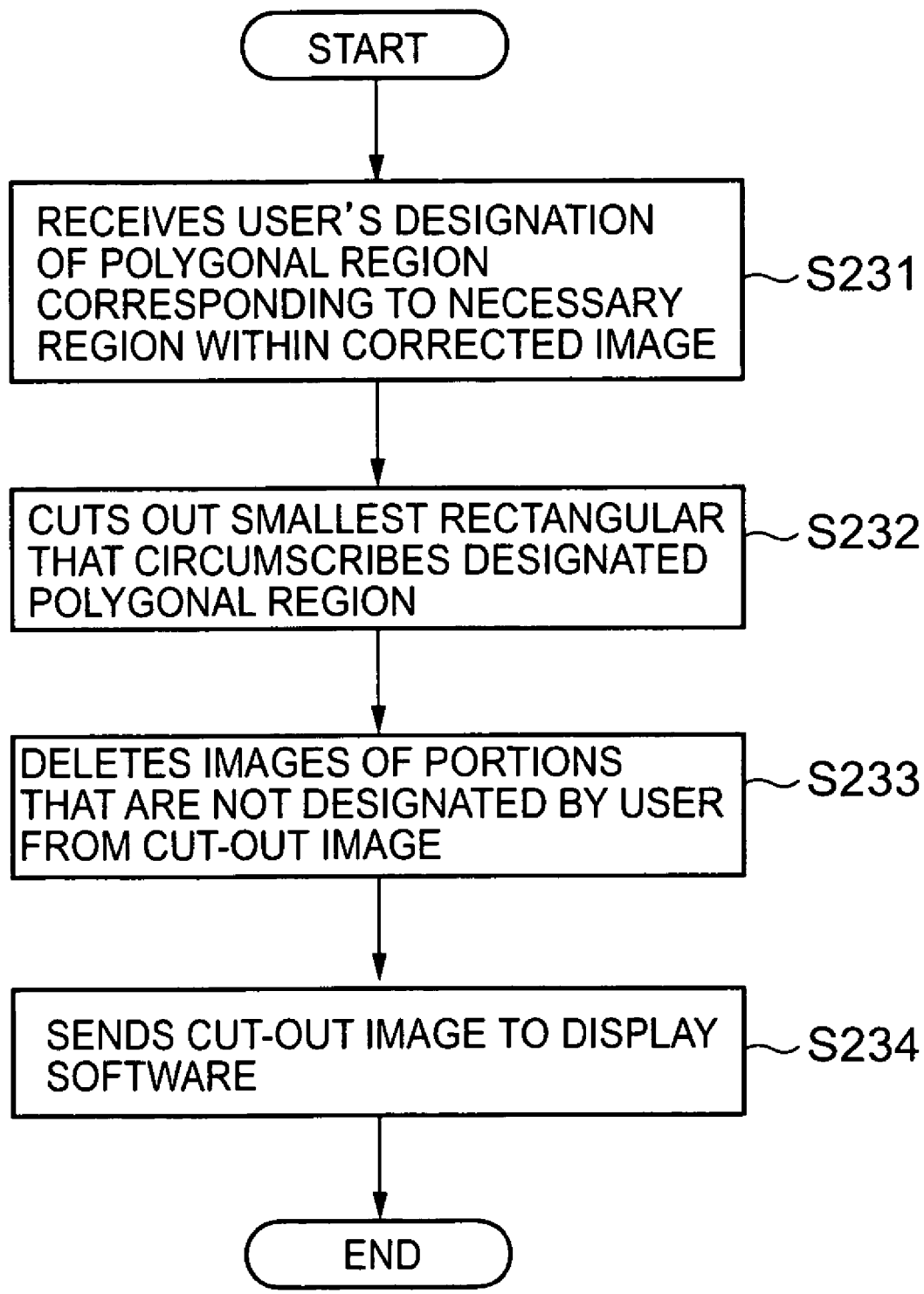
FIG. 30 is a flowchart showing an operation of the PC according to the tenth embodiment.
Figure 31A:
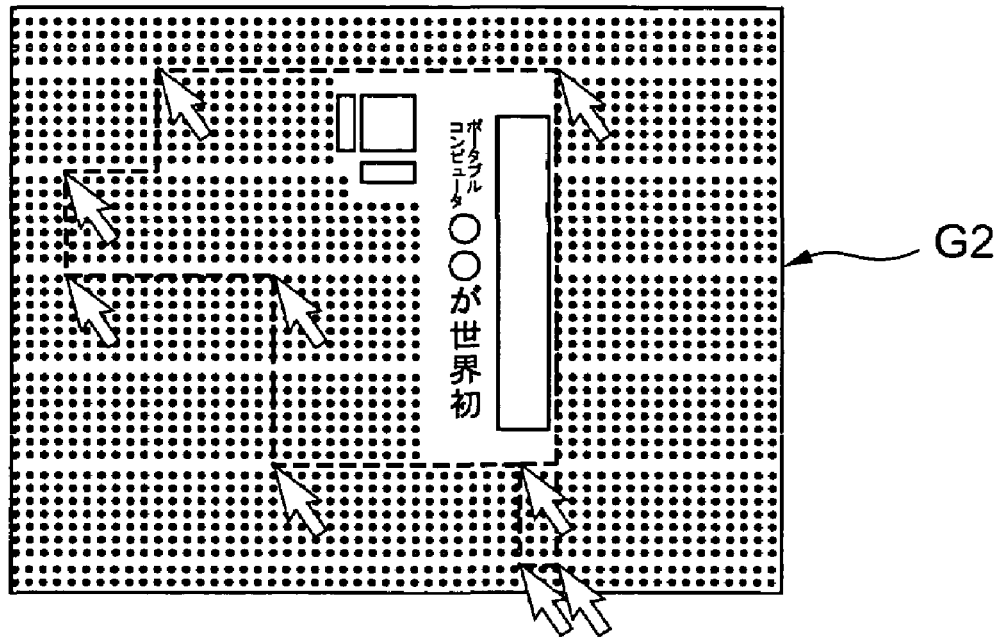
FIGS. 31A and 31B are explanatory diagrams showing the operation of he PC according, to the tenth embodiment.
Figure 31B:
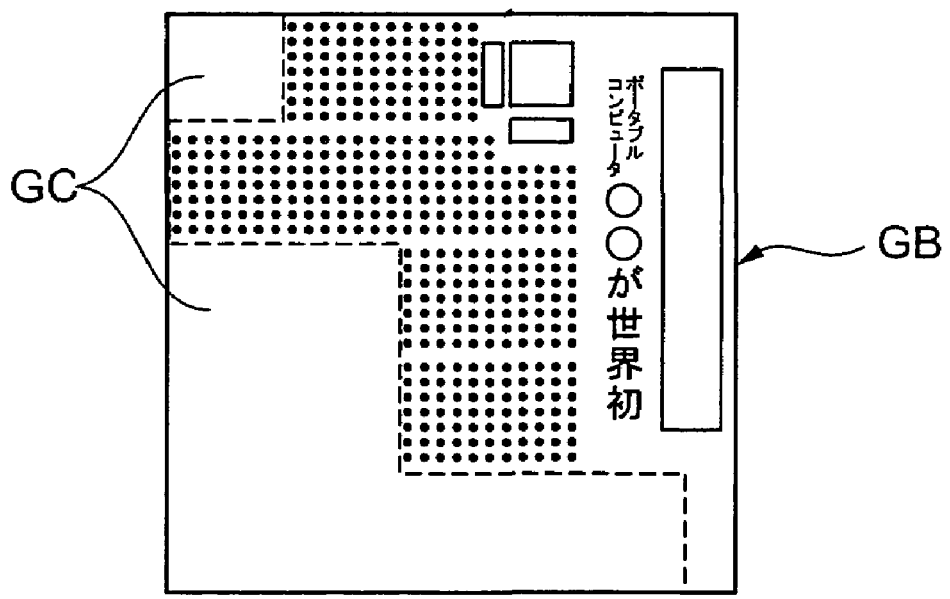

In the present embodiment, as shown in a flowchart of FIG. 30, the PC 2 receives user's designation of a polygonal region corresponding to a necessary region in an image G2 after being corrected (transformed), in accordance with an operation by the user (step S231). The designation of the necessary region is done by user's designating each vertex of the polygonal region which the user wants to project, by operation of the mouse. Then, the PC 2 cuts out the smallest rectangle that circumscribes the designated polygonal region from the image G2 (step S232). Then, the PC 2 deletes (or whitens) regions GC corresponding to portions which are not designated by the user in the cut-out region (step S233), and sends an image GB representing the region cut out in step S232 to the display software (step S234, FIG. 31B), so that the image GB is displayed on the display device 25.

Therefore, final adjustment can be performed on a captured image obtained by image-capturing a written material A which does not fully fall inside the image range. In addition, the captured image projection apparatus can deal with the case where the user's necessary region is not rectangle.

Eleventh Embodiment

Figure 32:
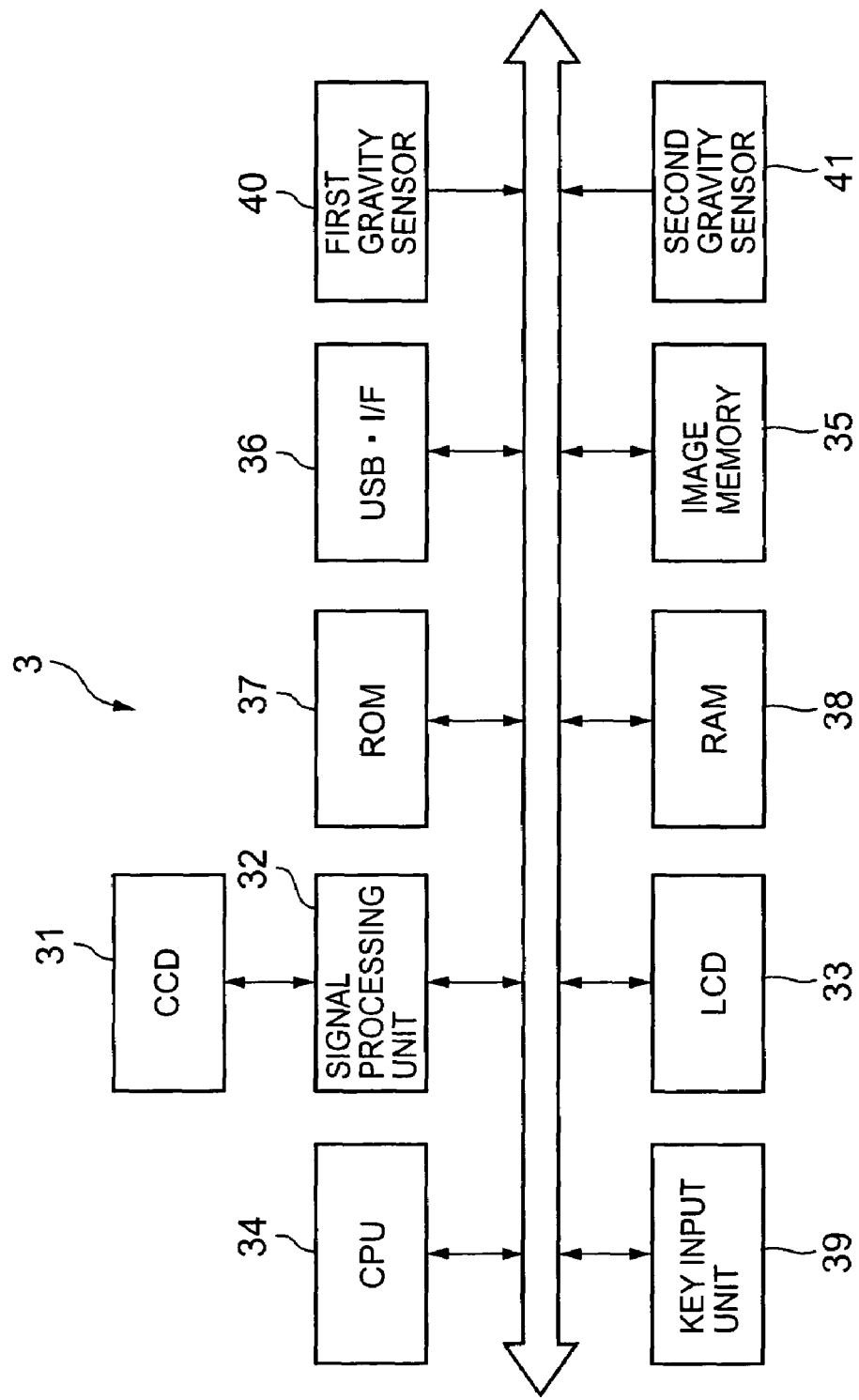
FIG. 32 is a block diagram showing a schematic electric structure of the calligraphy/drawing camera according to the eleventh embodiment of the present invention.

The eleventh embodiment of the present invention will be explained. The present embodiment relates to a method for automatically obtaining an image capturing angle used for adjusting the captured image of the written material A accurately and in real time. In the present embodiment, the captured image projection apparatus having the same configuration as that shown in FIG. 1 to FIG. 3 additionally comprises a first gravity sensor 40 secured to the camera 3C and a second gravity sensor 41 secured to the camera mounting 3A, as shown in FIG. 32. A program for controlling the PC 2 to perform a later-described image capturing angle obtaining process is stored in the storage device 23 of the PC 2.

Figure 33:
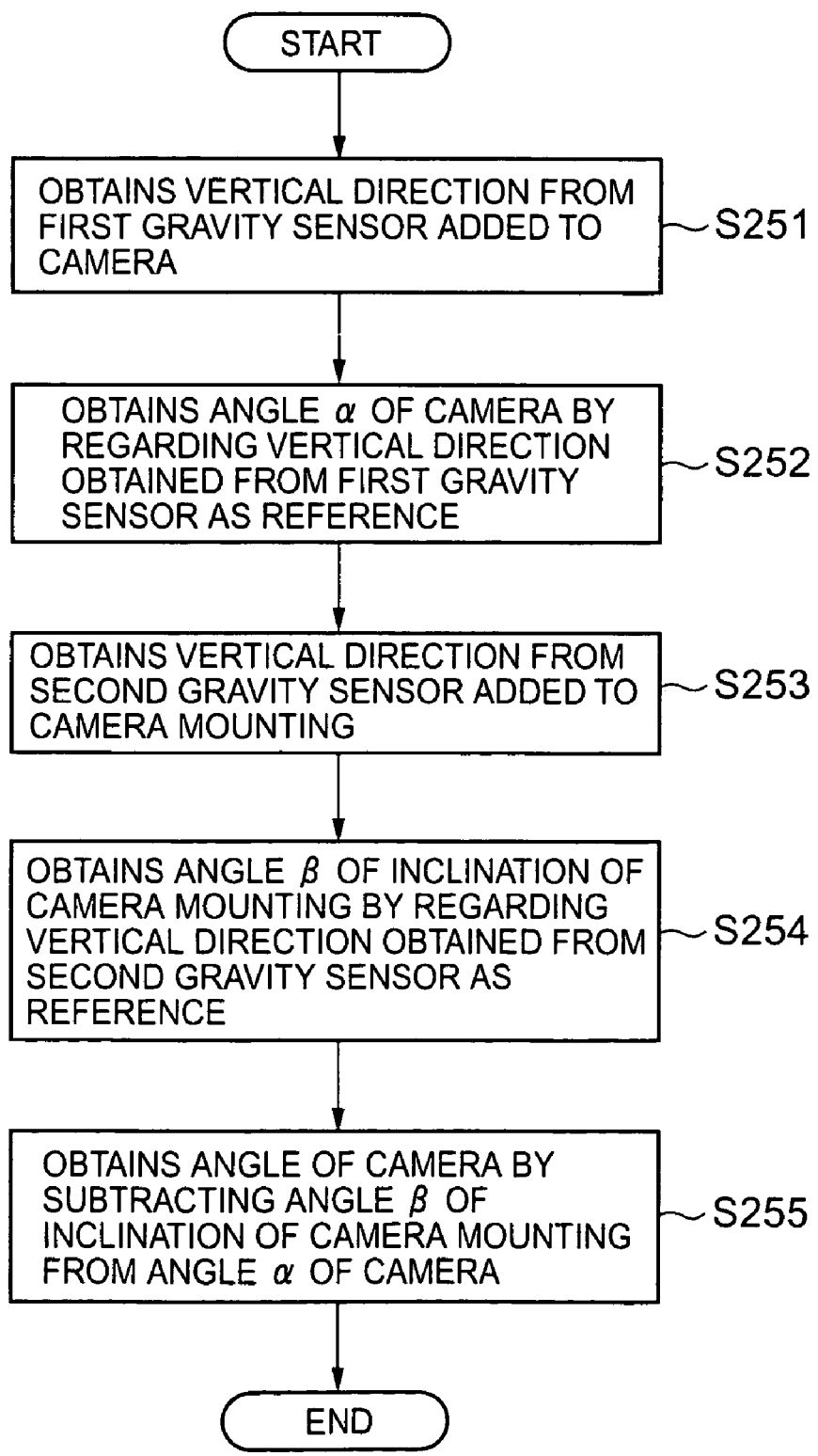
FIG. 33 is a flowchart showing the content of an image capturing angle obtaining process performed by the PC according to the eleventh embodiment.
Figure 34:
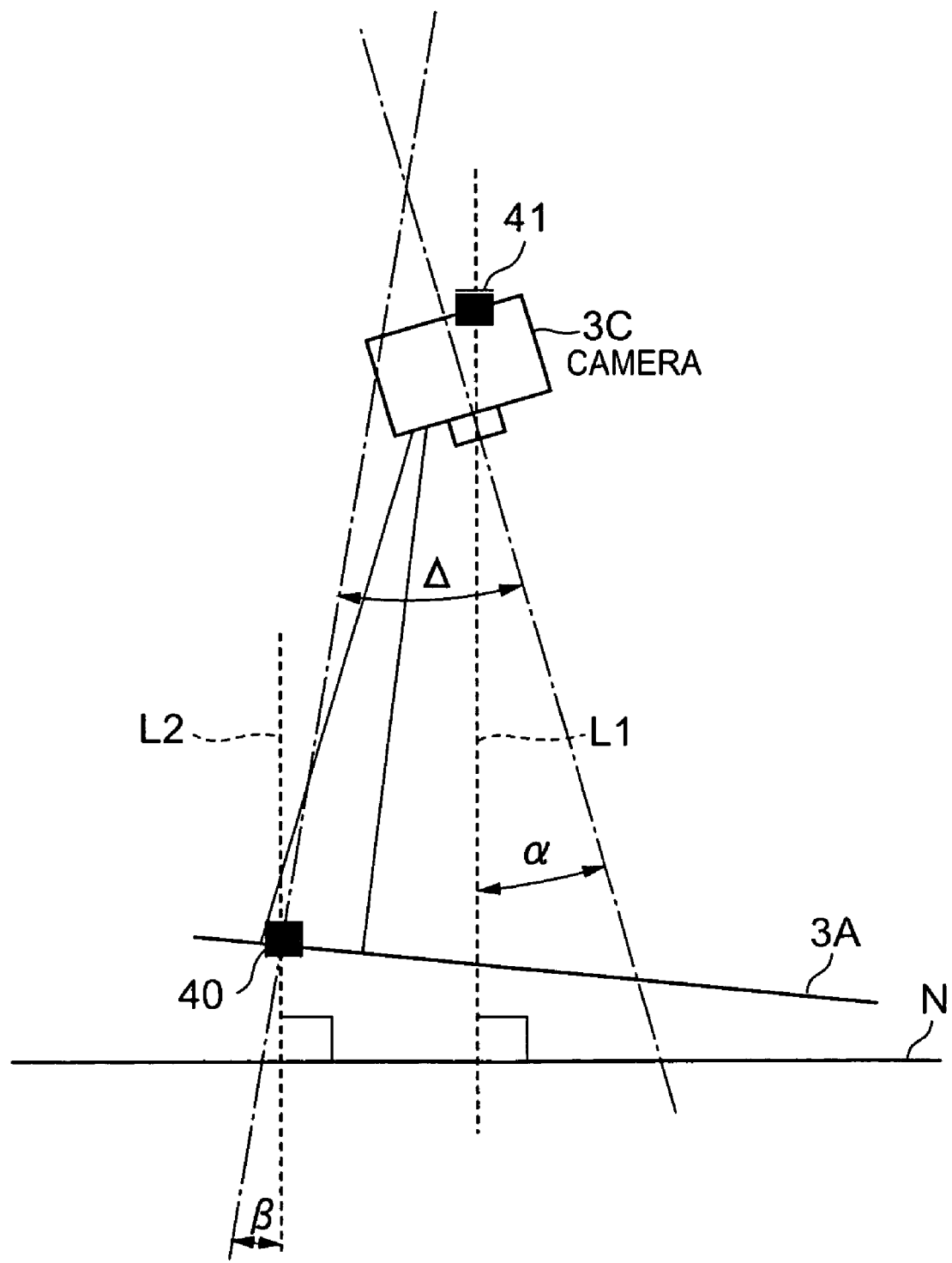
FIG. 34 is an explanatory diagrams showing a state of the calligraphy/drawing camera when obtaining an image capturing angle.

The content of the image capturing angle obtaining process by the PC 2 in the present embodiment will be explained with reference to a flowchart shown in FIG. 33. The PC 2 obtains a vertical direction L1 from the first gravity sensor 40 added to the camera 3C (step S251), and obtains the angle α of the camera 3C with respect to the vertical direction L1 (step S252). Then, the PC 2 obtains a vertical direction L2 from the second gravity sensor 41 added to the camera mounting 3A (step S253), and obtains the angle β of the camera mounting 3A with respect to the vertical direction L2 (step S254). After this, the PC 2 obtains the true inclination angle Δ (image capturing angle) of the camera 3C by subtracting the inclination angle β of the camera mounting 3A from the inclination angle α of the camera 3C (step S255).

Therefore, according to the present embodiment, the captured image projection apparatus can adjust the captured image by using the image capturing angle (Δ) obtained in the way described above. That is, trapezoidal correction in the vertical direction and in the horizontal direction is performed on the captured image of the written material A placed on the camera mounting 3A by using the image capturing angle (Δ). Due to this, the same image as that obtained by image-capturing the written material A vertically can be obtained.

Furthermore, the captured image projection apparatus can automatically obtain the image capturing angle (Δ) accurately in real time, without the preparatory steps as in the third and fourth embodiments, which is convenient for the user.

In the embodiments described above, there has been explained a captured image projection apparatus in which the projection section of the present invention is realized by the projector 1 and the correction section of the present invention is realized by the PC 2. In this explanation, various image processes relating to correction of a captured image are performed by the PC 2. However, the present invention is not limited to this, but the above-described various image processes may be performed by the projector 1 and the calligraphy/drawing camera 3. In this case, the PC 2 may not be used. Further, the projector 1 and the calligraphy/drawing camera 3 may be integral.

Each of the above-described embodiments may not be realized separately, but may be realized in combination.

As explained above, according to the present invention, since the captured image is corrected based on image information obtained from the captured image, not only correction of trapezoidal deformation but also various corrections can be performed on the captured image. Due to this, it is possible to deal with various corrections necessary for adjustment of the captured image before projection.

Further, according to the present invention, the inclination of the captured image can be corrected based on a proper image capturing angle directly obtained from the captured image. Due to this, it becomes possible to accurately perform correction on the captured image before projection.

Still further, according to the present invention, a proper image capturing angle can be obtained even in a case where the captured image is obtained in a state where the written material is not placed on the camera mounting and the camera mounting is inclined. Due to this, correction before projection, of the captured image obtained by the camera supported by the camera mounting can be accurately performed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-157384 filed on Jun. 2, 2003 and including specification, claims, drawings and summary. The disclosure of the above Japanese Patent Application is incorporated herein by reference in its entirety.

What is claimed is:

1. A captured image projection apparatus for image-capturing a written material by a camera supported by a camera mounting and projecting a captured image obtained by the image-capturing on a screen, said apparatus comprising:
   a first inclination angle detection section which detects an inclination angle of said camera which is produced by an image capturing direction of said camera and a first vertical line;
   a second inclination angle detection section which detects an inclination angle of said camera mounting which is produced by a perpendicular line drawn towards said camera mounting and a second vertical line;
   a calculation section which calculates an image capturing angle of said camera to the written material, based on both of the inclination angle of said camera and the inclination angle of said camera mounting detected by said first and second inclination angle detection sections; and
   a correction section which corrects an inclination of the captured image, based on the image capturing angle calculated by said calculation section.

2. The captured image projection apparatus according to claim 1, further comprising a cutting-out section which cuts out an image region corresponding to the written material within the captured image after the captured image is corrected by said correction section.

3. The captured image projection apparatus according to claim 1, further comprising:
   a designation reception section which receives, from a user, designation of a region to be cut out from the captured image after the captured image is corrected by said correction section; and
   a cutting-out section which cuts out the designated region from the captured image after the captured image is corrected.

4. The captured image projection apparatus according to claim 1, wherein a first gravity sensor is secured to the camera, and a second gravity sensor is secured to the camera mounting; and
   wherein the first vertical line is obtained using the first gravity sensor, and the second vertical line obtained using the second gravity sensor.

5. A captured image correction method for a captured image projection apparatus which image-captures a written material by a camera supported by a camera mounting and projects a captured imaged obtained by the image-capturing on a screen, said method comprising:
   detecting an inclination angle of said camera which is produced by an image capturing direction of said camera and a first vertical line, and an inclination angle of said camera mounting which is produced by a perpendicular line drawn from said camera to said camera mounting and a second vertical line;

calculating an image capturing angle of said camera to the written material, based on both of the detected inclination angle of said camera and the detected inclination angle of said camera mounting; and correcting an inclination of the captured image in accordance with the calculated image capturing angle.

6. The captured image correction method according claim 5, wherein a first gravity sensor is secured to the camera, and a second gravity sensor is secured to the camera mounting; and wherein the first vertical line is obtained using the first gravity sensor, and the second vertical line obtained using the second gravity sensor.

7. A computer-readable storage medium having a computer-readable program stored thereon that is executable a computer that is included in a captured image projection apparatus which image-captures a written material by a camera supported by a camera mounting and projects a captured image obtained by the image-capturing on a screen, wherein the program is executable by the computer to control the computer to function as:

a calculation section, which calculates an image capturing angle of said camera to the written material, based on: (i) an inclination angle of said camera which is produced by an image capturing direction of said camera and a first vertical line, and (ii) an inclination angle of said camera mounting which is produced by a perpendicular line drawn from said camera to said camera mounting and a second vertical line; and a correction section which corrects an inclination of the captured image based on the image capturing angle calculated by said calculation section.

8. The computer-readable storage medium according to claim 7, wherein a first gravity sensor is secured to the camera, and a second gravity sensor is secured to the camera mounting; and wherein the first vertical line is obtained using the first gravity sensor, and the second vertical line obtained using the second gravity sensor.

* * * * *